(12) United States Patent
Carlson et al.

(10) Patent No.: US 8,416,811 B2
(45) Date of Patent: Apr. 9, 2013

(54) COORDINATED TIMING NETWORK HAVING SERVERS OF DIFFERENT CAPABILITIES

(75) Inventors: Scott M. Carlson, Tucson, AZ (US); Donald Crabtree, Port Ewen, NY (US); Dennis J. Dahlen, Rhinebeck, NY (US); Noshir R. Dhondy, Saugerties, NY (US); Michel H. T. Hack, Cortlandt Manor, NY (US); Denise M. Sevigny, Wappingers Falls, NY (US); Judith A. Wierbowski, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 12/100,872

(22) Filed: Apr. 10, 2008

(65) Prior Publication Data

US 2009/0257456 A1    Oct. 15, 2009

(51) Int. Cl.
*H04J 3/06* (2006.01)

(52) U.S. Cl.
USPC .......................... 370/503; 370/466; 709/248

(58) Field of Classification Search .......... 370/503–520, 370/466; 709/206, 248, 216, 223; 714/4
See application file for complete search history.

(56) References Cited

U.S. PATENT DOCUMENTS

| | | | |
|---|---|---|---|
| 4,894,846 A | 1/1990 | Fine | |
| 5,481,258 A | 1/1996 | Fawcett et al. | |
| 5,602,992 A | 2/1997 | Danneels | |
| 5,636,373 A | 6/1997 | Glendening et al. | |
| 5,689,688 A | 11/1997 | Strong et al. | |
| 5,784,421 A | 7/1998 | Dolev et al. | |
| 5,812,749 A | 9/1998 | Fernandez et al. | |
| 5,848,028 A | 12/1998 | Burklin | |
| 5,925,107 A | 7/1999 | Bartfai et al. | |
| 5,968,133 A | 10/1999 | Latham et al. | |
| 6,173,023 B1 | 1/2001 | Tanonaka et al. | |
| 6,253,335 B1 | 6/2001 | Nakajima et al. | |
| 6,351,821 B1 | 2/2002 | Voth | |
| 6,535,491 B2 | 3/2003 | Gai et al. | |

(Continued)

FOREIGN PATENT DOCUMENTS

| JP | 11184825 A | 7/1999 |
|---|---|---|
| JP | 2000155729 A | 6/2000 |

(Continued)

OTHER PUBLICATIONS

Mills et al, Internet Time Synchronization: The Network Time Protocol, Oct. 1991, IEEE, vol. 39. pp. 1482-1493.*

(Continued)

*Primary Examiner* — Michael Thier
*Assistant Examiner* — Vincelas Louis
(74) *Attorney, Agent, or Firm* — John E. Campbell; Blanche E. Schiller, Esq.; Heslin Rothenberg Farley & Mesiti P.C.

(57) ABSTRACT

Communication and processing within a timing network that supports servers having different capabilities are facilitated. Individual servers of the network are dynamically updated without disrupting the operational characteristics of the timing network. New capabilities are not utilized between two servers until it is known that both servers are capable of supporting the new features. One server communicates to another server at an acceptable level of the another server.

19 Claims, 21 Drawing Sheets

U.S. PATENT DOCUMENTS

| | | | |
|---|---|---|---|
| 6,591,370 | B1 | 7/2003 | Lovett et al. |
| 6,606,362 | B1 | 8/2003 | Daizell et al. |
| 6,618,166 | B1 | 9/2003 | Suzue |
| 6,636,987 | B1 | 10/2003 | Ruffini |
| 6,697,382 | B1 | 2/2004 | Eatherton |
| 6,704,801 | B1 | 3/2004 | Minyard |
| 6,714,563 | B1 | 3/2004 | Kushi |
| 6,742,044 | B1 | 5/2004 | Aviani et al. |
| 6,748,451 | B2 | 6/2004 | Woods et al. |
| 6,754,171 | B1 | 6/2004 | Bernier et al. |
| 6,760,316 | B1 | 7/2004 | Hebsgaard et al. |
| 6,768,452 | B2 | 7/2004 | Gilkes |
| 6,819,682 | B1 | 11/2004 | Rabenko et al. |
| 6,895,189 | B1 | 5/2005 | Bedrosian |
| 7,103,514 | B1 | 9/2006 | Carlson et al. |
| 7,139,346 | B2 | 11/2006 | Skahan, Jr. et al. |
| 7,146,504 | B2 | 12/2006 | Parks et al. |
| 7,185,111 | B2* | 2/2007 | Fulghum et al. ............. 709/248 |
| 7,283,568 | B2 | 10/2007 | Robie et al. |
| 7,356,725 | B2 | 4/2008 | Engler |
| 7,394,802 | B2 | 7/2008 | Jun et al. |
| 7,395,448 | B2 | 7/2008 | Smith |
| 7,448,061 | B2* | 11/2008 | Richards et al. ............... 725/82 |
| 7,454,648 | B2 | 11/2008 | Dahlen |
| 7,475,272 | B2 | 1/2009 | Carlson |
| 7,496,606 | B2* | 2/2009 | Hind et al. ............................. 1/1 |
| 7,535,931 | B1 | 5/2009 | Zampetti et al. |
| 7,539,777 | B1* | 5/2009 | Aitken ......................... 709/248 |
| 7,571,268 | B2 | 8/2009 | Kern et al. |
| 7,617,410 | B2 | 11/2009 | Check et al. |
| 7,688,865 | B2 | 3/2010 | Carlson et al. |
| 7,689,718 | B2 | 3/2010 | Carlson et al. |
| 7,926,096 | B2* | 4/2011 | Ali et al. ............................ 726/9 |
| 2002/0027886 | A1 | 3/2002 | Fischer et al. |
| 2002/0039370 | A1 | 4/2002 | Elliot |
| 2002/0073228 | A1 | 6/2002 | Cognet |
| 2002/0078243 | A1 | 6/2002 | Rich et al. |
| 2002/0131370 | A1 | 9/2002 | Chuah et al. |
| 2002/0131398 | A1 | 9/2002 | Taylor |
| 2003/0035444 | A1 | 2/2003 | Zwack |
| 2003/0048811 | A1 | 3/2003 | Robie et al. |
| 2003/0152177 | A1 | 8/2003 | Cahill-O'Brien |
| 2003/0200338 | A1* | 10/2003 | Fulghum et al. ............. 709/248 |
| 2003/0235216 | A1 | 12/2003 | Gustin |
| 2004/0073718 | A1 | 4/2004 | Johannessen et al. |
| 2004/0076187 | A1 | 4/2004 | Peled |
| 2004/0125822 | A1 | 7/2004 | Jun et al. |
| 2004/0167990 | A1 | 8/2004 | Peer |
| 2005/0020275 | A1 | 1/2005 | Agrawala et al. |
| 2005/0033862 | A1 | 2/2005 | Blum |
| 2005/0135429 | A1 | 6/2005 | Bingham et al. |
| 2005/0169233 | A1 | 8/2005 | Kandala et al. |
| 2007/0058491 | A1 | 3/2007 | Dahlen et al. |
| 2007/0086489 | A1 | 4/2007 | Carlson |
| 2007/0086490 | A1 | 4/2007 | Carlson |
| 2008/0028254 | A1 | 1/2008 | Smith |
| 2008/0059655 | A1 | 3/2008 | Carlson |
| 2008/0059808 | A1 | 3/2008 | Engler |
| 2008/0072096 | A1 | 3/2008 | Smith |
| 2008/0072097 | A1 | 3/2008 | Check |
| 2008/0162984 | A1 | 7/2008 | Kalra |
| 2008/0183849 | A1 | 7/2008 | Carlson |
| 2008/0183877 | A1 | 7/2008 | Carlson |
| 2008/0183895 | A1 | 7/2008 | Carlson |
| 2008/0183896 | A1 | 7/2008 | Carlson |
| 2008/0183897 | A1* | 7/2008 | Carlson et al. ................ 709/248 |
| 2008/0183898 | A1 | 7/2008 | Carlson |
| 2008/0183899 | A1 | 7/2008 | Carlson |
| 2008/0184060 | A1 | 7/2008 | Carlson |
| 2008/0225897 | A1 | 9/2008 | Bryant et al. |
| 2009/0070618 | A1 | 3/2009 | Dahlen et al. |
| 2009/0257456 | A1 | 10/2009 | Carlson et al. |
| 2009/0259881 | A1 | 10/2009 | Carlson et al. |
| 2010/0049818 | A1* | 2/2010 | Walker .......................... 709/206 |
| 2010/0100761 | A1 | 4/2010 | Carlson |
| 2010/0100762 | A1 | 4/2010 | Carlson |

FOREIGN PATENT DOCUMENTS

| | | | |
|---|---|---|---|
| JP | 2004199366 | A | 7/2004 |
| JP | 2005100030 | A | 4/2005 |
| JP | 2005227192 | A | 8/2005 |
| WO | 01/95550 | A2 | 12/2001 |
| WO | 02/44877 | A1 | 6/2002 |
| WO | 03/036395 | A1 | 5/2003 |

OTHER PUBLICATIONS

Iain Neville, Ibm system Z Technical Conference, Apr. 2007, IBM Corporation.*
Noshir Dhondy, Introduction to Server Time Protocol with IBM System and Technology group, Oct. 9-13, 2006.*
Server Time Protocol for IBM Z9 System, ZSeries 990 and 890; non-raised -floor support for system Z9 BC, Oct. 2006.*
Trowel et al , S/390 Time Management and IBM 9037 Sysplex Timer, 1999.*
J. Burbank et al., "The Network Time Protocol Version 4 Protocol Specification; draft-ietf-ntp-ntpv4-proto-02.txt", IETF Standard-Working-Draft, Internet Engineering Task Force, IETF, CH, vol. ntp, No. 2, Mar. 2006, XP015045008, ISSN: 0000-0004.
L.S. Liang, "Time Server in Advanced Automation Local Area Network", Computer Standards and Interfaces, Elsevier Sequoia, Lausanne,CH, vol. 6, No. 3, Jan. 1989,pp. 223-227, XP000112504, ISSN: 0920-5489.
Kadoch, Michel, "ATM Signalling: A Tutorial," Canadian Conference on Electrical and Computer Engineering—Congres Canadien En Genie Electrique Et Informatique, vol. 1, Sep. 5, 1995; pp. 420-423, XP000618815; p. 421-p. 422.
Sun, Kun et al., "Fault-Tolerant Cluster-Wise Clock Synchronization for Wireless Sensor Networks," Jul.-Sep. 2005, IEEE Transactions on Dependable and Secure Computing, vol. 2, No. 3, pp. 177-189.
"z/Architecture Principles of Operation," IBM Publication No. SA22-7832-04, Fifth Edition, Sep. 2005.
"z/Architecture Principles of Operation," IBM Publication No. SA22-7832-05, Sixth Edition, Apr. 2007.
"z/Architecture Principles of Operation," IBM Publication No. SA22-7832-06, Seventh Edition, Feb. 2008.
International Search Report and Written Opinion for PCT/EP2007/058910 dated Nov. 6, 2007.
International Search Report and Written Opinion for PCT/EP2008/050482 dated Apr. 24, 2008.
International Search Report and Written Opinion for PCT/EP2008/050524 dated May 27, 2008.
International Search Report and Written Opinion for PCT/EP2008/050620 dated May 13, 2008.
International Search Report and Written Opinion for PCT/EP2008/050726 dated Aug. 1, 2008.
International Search Report and Written Opinion for PCT/EP2008/050739 dated Sep. 11, 2008.
Office Action for U.S. Appl. No. 11/468,352 dated Dec. 18, 2008.
Office Action for U.S. Appl. No. 11/468,352 dated Jun. 1, 2009.
Final Office Action for U.S. Appl. No. 11/468,352 dated Oct. 27, 2009.
Office Action for U.S. Appl. No. 11/468,352 dated Apr. 21, 2010.
Office Action for U.S. Appl. No. 11/876,152 dated Oct. 15, 2009.
Office Action for U.S. Appl. No. 11/876,199 dated Oct. 26, 2009.
Office Action for U.S. Appl. No. 11/876,240 dated Oct. 26, 2009.
Final Office Action for U.S. Appl. No. 11/876,240 dated Mar. 19, 2010.
Office Action for U.S. Appl. No. 11/876,272 dated Oct. 16, 2009.
Office Action for U.S. Appl. No. 11/940,518 dated Oct. 15, 2009.
Final Office Action for U.S. Appl. No. 11/940,518 dated Apr. 2, 2010.
Office Action for U.S. Appl. No. 11/940,558 dated Sep. 3, 2009.
Office Action for U.S. Appl. No. 12/100,660 dated Jul. 8, 2010.
Office Action for U.S. Appl. No. 12/100,872 dated May 28, 2010.
U.S. Appl. No. 12/748,539 entitled "Channel Subsystem Server Time Protocol Commands," Carlson et al., filed Mar. 29, 2010.
U.S. Appl. No. 12/782,144 entitled "Server Time Protocol Control Messages and Methods," Carlson et al., filed May 18, 2010.

Office Action for U.S. Appl. No. 12/541,485 dated Oct. 12, 2010.
Office Action for U.S. Appl. No. 12/782,144 dated Nov. 17, 2010.
Office Action for U.S. Appl. No. 12/748,539 dated Aug. 19, 2011.
Office Action for U.S. Appl. No. 11/876,240 dated Sep. 12, 2011.
Final Office Action for U.S. Appl. No. 11/876,240 dated Apr. 10, 2012.

* cited by examiner

COORDINATED TIMING NETWORK HAVING SERVERS OF DIFFERENT CAPABILITIES

TECHNICAL FIELD

This invention relates, in general, to a timing network of servers, and in particular, to facilitating communication and processing within such a network.

BACKGROUND OF THE INVENTION

For performance and data integrity, computing systems that access shared data, such as a Sysplex offered by International Business Machines Corporation, Armonk, N.Y., must be able to maintain time of day (TOD) clock synchronization to an accuracy that is better than best case communication time between the systems. Currently, in one example, to meet the synchronization requirements, a timer, such as the IBM® Sysplex Timer®, is used. This timer requires expensive dedicated timing links and a separate external box. IBM® and Sysplex Timer® are registered trademarks of International Business Machines Corporation, Armonk, N.Y.

Networks, such as the Network Timing Protocol (NTP), provide time synchronization, but do not meet the accuracy requirements of high-end systems. NTP requires that each server has access to an external time source that provides accuracy to a microsecond level in order to ensure all servers synchronize to the same reference time. This is a problem for those systems that do not have a capability to attach to external time servers that provide this level of accuracy. Further, a requirement of GPS receivers or similar attachment on each system may be considered infeasible for maintenance, security and reliability reasons.

SUMMARY OF THE INVENTION

To address the deficiencies of the above facilities, a Coordinated Timing Network (CTN) is provided. In such a network, a plurality of servers exist and communicate timing information to maintain time synchronization. At times, however, new timing capabilities are developed, and thus, a need exists for a facility to update the servers with the new capabilities. In one embodiment, the servers are not updated concurrently, but instead, the servers are updated individually without disrupting the operational characteristics of the environment. Thus, a need exists for a capability that facilitates communication within a network that allows servers to have and operate at different capabilities.

The shortcomings of the prior art are overcome and additional advantages are provided through the provision of an article of manufacture that includes at least one computer usable medium having computer readable program code logic to facilitate communication within a timing network of servers. The computer readable program code logic when executing performing, for instance, determining a version number, which indicates a level of timing capability supported by a server having that version number associated therewith, that is common to one server and another server of a timing network, wherein the one server and the another server support one or more levels of timing capability, and wherein the one server operates, independent of communication, at one level of timing capability and the another server operates, independent of communication, at another level of timing capability, the one level of timing capability being different from the another level of timing capability; and sending a communication from the one server to the another server, the communication adhering to a level of timing capability indicated by the version number that is common to the one server and the another server.

Systems and methods relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1A:
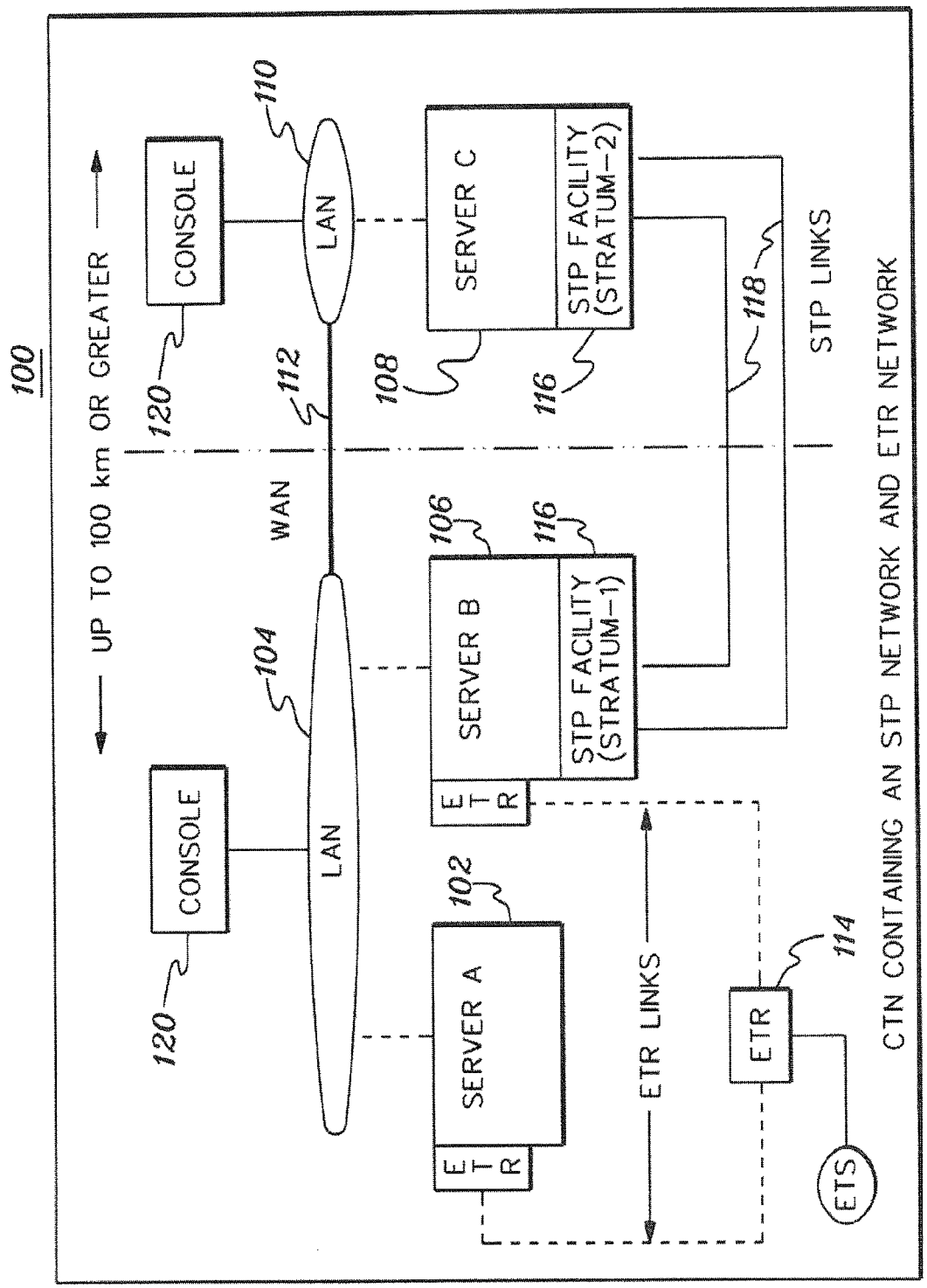
FIG. 1A depicts one example of a mixed coordinated timing network to incorporate one or more aspects of the present invention.

In accordance with an aspect of the present invention, a capability is provided that facilitates communication and processing within a timing network that supports servers having different capabilities. A technique is provided to dynamically update individual servers of the network with new capabilities (also referred to herein as features) without disrupting the operational characteristics of the timing network. New capabilities are not utilized between two servers until it is known that both servers are capable of supporting the features. The information about the capabilities supported at a server, which is indicated by a version number in effect at the server, is provided to other servers of the network. A server maintains the information relating to the features supported by other servers and communicates with another server and makes decisions according to the version number supported by that another server.

One environment including one or more aspects of the present invention is a Coordinated Timing Network (CTN). In a Coordinated Timing Network, multiple distinct computing systems maintain time synchronization to form the Coordinated Timing Network. Systems in the Coordinated Timing Network employ a message based protocol, referred to as a Server Time Protocol (STP), to pass timekeeping information between the systems over existing, high-speed data links. This enables the time of day (TOD) clocks at each system to be synchronized to the accuracy required in today's high-end computing systems. Since the protocol makes use of technology within a computing system, synchronization accuracy scales as technology improves. A computing system that provides an STP facility is referred to as a time server or server herein.

A server defined in a CTN as an active time server provides primary reference time for the CTN. The server in a CTN that determines CST (an estimate of the time-of-day (TOD) clock for the CTN) based on information from another server in the CTN is referred to as the secondary time server. The active time server may obtain its time from an external time source, which provides the means to synchronize the time of day clocks in a CTN to a defined time standard.

Servers in a CTN that are in the synchronized state are assigned a value, referred to as a stratum level, that indicates the number of servers between it and a primary time server. A primary time server operates at a stratum level of 1; secondary time servers operate at a stratum level of 2 or above, which increases as the number of servers in the timing path to the stratum-1 increases. In general, the quality of timekeeping information decreases as the stratum level increases. The server that is unsynchronized is assigned a stratum level of 0.

The STP facility provides the procedures required to transmit, receive and process STP messages. STP messages are transmitted over one or more data links between servers. The data link that has been established between two servers is referred to as an STP path. The STP facility provides the facilities to establish and maintain STP paths.

STP messages include a message command and a message response. Two types of STP messages are supported. The exchange time parameters (XTP) message and the STP control (STC) message. The XTP message is used to exchange the timekeeping information used to determine CST for the CTN. STP control messages are used to set and modify various CTN parameters required by servers in the CTN.

A CTN can operate, for instance, as one of two types of configurations: either as a mixed CTN configuration or as an STP-only CTN configuration. In a mixed CTN configuration, the servers are configured to be part of both an STP network and an External Time Reference (ETR) network. In a mixed CTN configuration, the servers in the CTN are configured with the same, non-null ETR network ID, and a timer (e.g., IBM® Sysplex Timer®) provides the primary time reference for the CTN. At least one server in the CTN is to step to timing signals provided by the Sysplex Timer® before synchronization can occur within the CTN. Servers not stepping to the Sysplex Timer® are secondary time servers and achieve synchronization by exchanging STP signals.

As one example, each server stepping to the timing signals of the Sysplex Timer® receives the time protocol parameters and propagates the information to secondary time servers in the CTN, using, for instance, a CTN parameter update procedure. One example of this procedure is described in U.S. Ser. No. 11/468,352, entitled "Coordinated Timing Network Configuration Parameter Update Procedure," Carlson et al., filed Aug. 30, 2006, which is hereby incorporated herein by reference in its entirety.

One example of a mixed CTN configuration 100 is described with reference to FIG. 1A. Mixed CTN configuration 100 includes, for instance, a Server A (102) coupled to a local area network (104), a Server B (106) coupled to local area network (104) and a Server C (108) coupled to a local area network (110). Each server is, for instance, a central processing complex based on the z/Architecture® offered by International Business Machines Corporation. z/Architecture® is a registered trademark of International Business Machines Corporation, Armonk, N.Y., USA. One embodiment of the z/Architecture® is described in "z/Architecture Principles of Operation," IBM Publication No. SA22-7832-05, April 2007, which is hereby incorporated herein by reference in its entirety.

Each local area network is coupled to a console 120, which allows the servers to communicate with one another via a console path. Further, local area network 104 and local area network 110 are coupled to one another via a wide area network 112.

Servers A and B are coupled to an external time reference network 114, and Servers B and C are configured to be part of an STP network 116. Server B is at a stratum-1 level and Server C is at a stratum-2 level. STP links 118 are used to couple the STP facility of Server B with the STP facility of Server C.

In an STP-only CTN, the servers in the CTN are configured to be part of an STP network and none are configured to be part of an ETR network. One example of an STP-only network 150 is described with reference to FIG. 1B. In this example, Server A (152) and Server B (154) are coupled to a LAN (156), and Server C (158) is coupled to a LAN (160). Each of the servers includes an STP facility 162, and each facility is coupled to one another via one or more STP links 164.

Further, LAN 156 is coupled to a console 170 and LAN 160 is coupled to a console 172. Console 170 is further coupled to an external time source (ETS) 174, such as a dial out to a telephone time server (e.g., ACTS: NIST Automated Computer Time Service). In this network, there is no ETR network. Server B has a stratum level of 1, and Servers A and C have a stratum level of 2.

The server that is to act as the active stratum-1 server in the network, such as an STP-only network, is specified as part of a stratum-1 configuration defined for the network. The stratum-1 configuration is maintained at each server of the network and provides information relating to the configuration of the network, including, for instance, the type of configuration defined for the network. The network can be configured as one of various types, including, for instance:

a) Null Configuration—In a null configuration, a stratum-1 server is not identified. The server remains unsynchronized until it attaches to a server that has a non-null stratum-1 configuration. The stratum-1 configuration at a server that is at stratum level 0 is equal to the null configuration when, for instance, it is not attached to any other server and the single CEC-CTN indicator in a stratum-1 configuration information block, described below, is zero.

b) Single Server Definition—In a single server definition, the stratum-1 configuration defines a single primary stratum-1 server that acts as the active stratum-1 server for the CTN. The loss of the primary stratum-1 server results in the loss of synchronized time in the CTN until a new stratum-1 configuration is specified from the console.

A single server stratum-1 configuration may also include an indication that the specified stratum-1 server is the only server (e.g., central electronic complex (CEC) or central processing complex (CPC)) in the CTN and that no other or additional servers will be part of the CTN. In this case, the CTN is referred to as a single CEC CTN. When a stratum-1 configuration indicates that it is a single CEC CTN, the configuration is a valid stratum-1 configuration for the initialized state of the server following a power on reset. When a single server stratum-1 configuration does not specify that it is a single CEC CTN, the configuration is not a valid stratum-1 configuration for the initialized state of the server following a power on reset and the stratum-1 configuration is set to the null configuration.

c) Dual Server Configuration—In a dual server configuration, the configuration includes a primary stratum-1 server and an alternate stratum-1 server. The use of a dual server configuration provides a mechanism for an alternate server to be able to take over the role of active stratum-1 server for the CTN. The alternate stratum-1 server can take over as the active stratum-1 without disruption to the synchronization capability of the CTN. The stratum-1 server (primary or alternate) that is acting as the active stratum-1 server for a CTN is indicated in the stratum-1 configuration information block maintained at each server in the CTN, as described below. The stratum-1 server that is not the active stratum-1 server is defined as the inactive stratum-1 server.

The inactive stratum-1 server in a dual server configuration takes over the role of the active stratum-1 server when it detects an active stratum-1 failure. An active stratum-1 failure is detected in a dual server configuration when one of the following occurs:
A stratum-1 system check signal is recognized; or
A console assisted recovery procedure is performed and indicates that an active stratum-1 failure has occurred.
The inactive stratum-1 server in a dual server configuration may perform the console assisted recovery when, for instance, the inactive stratum-1 server loses attachment to the active stratum-1 server.

d) Triad Configuration—In a triad configuration, the stratum-1 configuration includes a primary stratum-1 server, an alternate stratum-1 server, and an arbiter server. The definition of a triad configuration provides a mechanism for an alternate server to be able to take over the role of active stratum-1 server for the CTN, as defined for a dual server configuration. Additionally, the definition of an arbiter server, when configured with connectivity to both the primary stratum-1 and alternate stratum-1 servers, provides a mechanism for the inactive stratum-1 and arbiter servers to communicate with each other to be able to determine that an active stratum-1 server failure has occurred and that the inactive stratum-1 should take over as the active stratum-1 server.

The inactive stratum-1 server in a triad configuration takes over the role of the active stratum-1 when it recognizes an active stratum-1 failure. The inactive stratum-1 server recognizes an active stratum-1 failure when any of the following occurs:
A triad recovery procedure is performed and indicates that an active stratum-1 failure has occurred when both the inactive stratum-1 server and the arbiter agree that they both no longer have attachment to the active stratum-1 server.
A console assisted recovery procedure is performed and indicates that an active stratum-1 failure has occurred.
The inactive stratum-1 server performs the triad recovery procedure when the following conditions occur:
The inactive stratum-1 server loses attachment to the active stratum-1 server and has attachment to the arbiter.
The inactive stratum-1 server recognizes an active stratum-1 communication timeout and has attachment to the arbiter.
The inactive stratum-1 server performs the console assisted recovery when, for instance, the inactive stratum-1 server loses attachment to the active stratum-1 server and is not attached to the arbiter.
The inactive stratum-1 server performs the active stratum-1 takeover procedure to take over the role of the active stratum-1 server for the CTN.
The active stratum-1 server in a triad configuration gives up the role of active stratum-1 server when it detects that it has lost attachment to both the inactive stratum-1 server and the arbiter server. The active stratum-1 server performs an active stratum-1 surrender procedure to give up the role of the active stratum-1 server for the CTN.

In one example, the stratum-1 configuration information is maintained in a control block, referred to as a stratum-1 configuration information block (SCIB), that is stored on or accessible to each server of the network. The SCIB is used to identify the stratum-1 configuration for a network.

Figure 2:
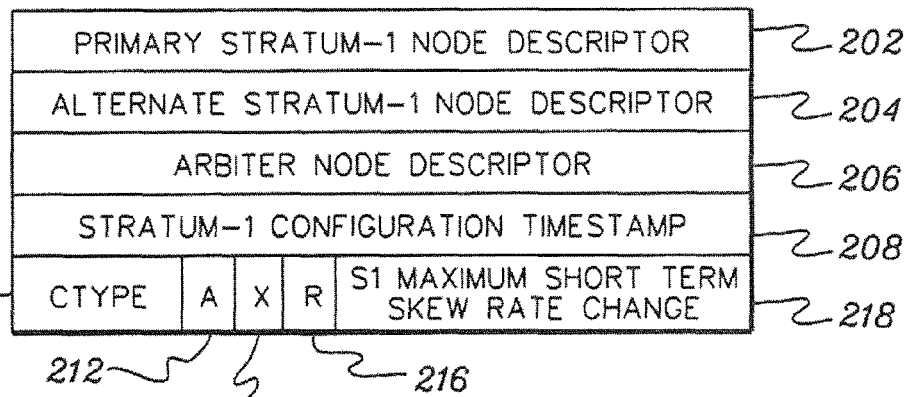
FIG. 2 depicts one example of a stratum-1 configuration information block, in accordance with an aspect of the present invention.

One embodiment of a stratum-1 configuration information block 200 is described with reference to FIG. 2. Stratum-1 configuration information block 200 includes, for instance, the following fields:

a) Primary Stratum-1 Node Descriptor 202: This field is valid when a single server, dual server or triad definition has been specified in the configuration type field of the configuration information block, described below, and when valid, includes the node descriptor of the primary stratum-1 node.

b) Alternate Stratum-1 Node Descriptor 204: This field is valid when a dual server or triad definition has been specified in the configuration type field, and when valid, includes the node descriptor of the alternate stratum-1 server node.

c) Arbiter Node Descriptor 206: This field is valid when a triad definition has been specified in the configuration type field and includes the node descriptor of the arbiter server node.

d) Stratum-1 Configuration Timestamp 208: This field includes a timestamp indicating the time at which the stratum-1 configuration information in this block became current at the server.

e) Configuration Type (CType) 210: This field specifies the type of stratum-1 configuration, as defined below:
Null definition—None of the node descriptors are valid.
Single server definition—Only the primary stratum-1 node descriptor is valid.
Dual server definition—The primary stratum-1 and alternate stratum-1 node descriptors are valid.
Triad definition—The primary stratum-1, alternate stratum-1 and arbiter node descriptors are valid.

f) Active Stratum-1 (A) 212: This field is valid when a dual server or triad definition has been specified and indicates whether the primary stratum-1 server or the alternate stratum-1 server is the active stratum-1 server.

g) Single CEC CTN (X) 214: This field is valid when the configuration type specifies a single server definition and when one, as an example, indicates the CTN is a single CEC CTN. When the field is, for instance, zero, the CTN is not a single CEC CTN.

h) Recovery Configuration (R) 216: This field indicates whether the stratum-1 configuration described by this block is the result of a stratum-1 recovery action or a console command.

i) Stratum-1 Maximum Short Term Skew Rate Change 218: This field includes a value that specifies the maximum possible change in the skew rate of the physical oscillator at the stratum-1 server that may occur over any specified period (e.g., 1 second).
On machines that are not capable of performing dynamic oscillator switching, the value is equal to the maximum stratum-1 oscillator frequency drift that can occur over a specified period (e.g., 1 second). On machines that are capable of performing dynamic oscillator switching, the value is set to the maximum range of skew tolerance specified for the oscillator. For example, on a machine that supports dynamic oscillator switching with oscillator skew tolerance specified at ±2 ppm to nominal frequency, the value is set to the equivalent of 4 ppm. A dynamic oscillator switch occurs when the physical oscillator used to drive the system TOD clock is switched from one oscillator to another.

In addition to the above control block, another control block, referred to as the new stratum-1 configuration information block (NSCIB), may be used to specify a new stratum-1 configuration for the CTN. Additionally, it may be used to specify an update to the CTN ID that is to occur concurrently with the stratum-1 configuration change.

In one example, the NSCIB at a server is meaningful when the server is configured to be part of an STP-only CTN configuration or if the STP-migration bit in the NSCIB is equal to one.

Figure 3:
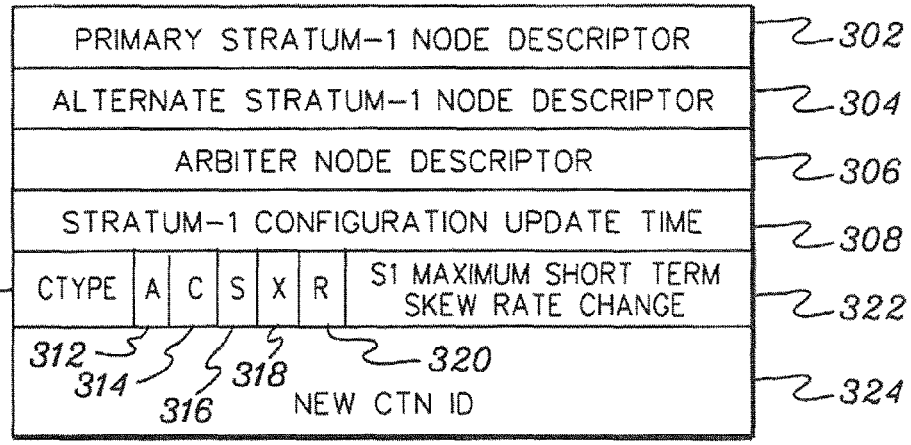
FIG. 3 depicts one example of a new stratum-1 configuration information block, in accordance with an aspect of the present invention.

One embodiment of a new stratum-1 configuration information block 300 is described with reference to FIG. 3. New stratum-1 configuration information block 300 includes, for instance, the following fields:

a) Primary Stratum-1 Node Descriptor 302: This field is valid when a single-server, dual server or triad definition has been specified in the configuration type field and includes the node descriptor of the new primary stratum-1 node.

b) Alternate Stratum-1 Node Descriptor 304: This field is valid when a dual server or triad definition has been specified in the configuration type field and includes the node descriptor of the new alternate stratum-1 node.

c) Arbiter Node Descriptor 306: This field is valid when a triad definition has been specified in the configuration type field and includes the node descriptor of the new arbiter node.

d) Stratum-1 Configuration Update Time 308: When the server is configured to be part of an STP-only CTN, this field includes a timestamp that indicates when the values in this block are to become current for the CTN.

e) Configuration Type (CType) 310: This field specifies the type of stratum-1 configuration as defined below:
Null definition—None of the node descriptors are valid.
Single server definition—Only the primary stratum-1 node descriptor is valid.
Dual server definition—The primary stratum-1 and alternate stratum-1 node descriptors are valid.
Triad definition—The primary stratum-1, alternate stratum-1 and arbiter node descriptors are valid.

f) Active Stratum-1 (A) 312: This field is valid when a dual server or triad definition has been specified and indicates whether the primary stratum-1 server or the alternate stratum-1 server is the active stratum-1 server.

g) CTN ID Change (C) 314: When the server is configured to be part of an STP-only CTN, this field indicates whether a CTN ID change is being requested and the CTN ID is valid. The change occurs at the stratum-1 configuration update time.
The CTN ID is a value that is used to identify a CTN. The CTN ID includes, for instance, an STP network ID and an ETR network number. The STP network ID identifies the STP network, if any, that is configured for the server. The ETR network number identifies the ETR network number, if any, that is configured for this server.

h) STP Migration Configuration (S) 316: This field is meaningful when, for instance, the server is not configured as an STP-only CTN. The field indicates whether an STP-only migration stratum-1 configuration has been defined for the server. When the field is, for instance, one, the NSCIB includes the stratum-1 configuration that is to become current when the CTN ID at the server is modified to an STP-only configuration. When the field is, for instance, zero, a change is being made from one STP only SCIB to another, not migrating from a mixed STP/ETR network to an STP only network.

i) Single CEC CTN (X) 318: This field is valid when the configuration type specifies a single server definition and when one, as an example, indicates the CTN is a single CEC CTN. When the field is, for instance, zero, the CTN is not a single CEC CTN.

j) Recovery Configuration (R) 320: This field indicates whether the stratum-1 configuration described by this block is the result of a stratum-1 recovery action or a console command.

k) Stratum-1 Maximum Short Term Skew Rate Change 322: This field includes a value that specifies the maximum possible change in the skew rate of the physical oscillator at the new stratum-1 server that may occur over any specified period (e.g., 1 second).

l) New CTN ID 324: This field is valid when the CTN-ID change indicator specifies a CTN ID change request and a valid CTN ID. This field specifies the new CTN ID.

If the new stratum-1 configuration information block is not to be used to specify an update to the CTN ID, then the block may not include the CTN ID change bit or the new CTN ID, as an example. Further details on coordinated timing networks and on defining a stratum-1 configuration for a timing network are described in the following applications: U.S. Ser. No. 11/876,152 entitled "Facilitating Synchronization of Servers in a Coordinated Timing Network," filed Oct. 22, 2007; U.S. Ser. No. 11/876,199 entitled "Definition of a Primary Active Server in a Coordinated Timing Network," filed Oct. 22, 2007; and U.S. Ser. No. 11/876,240 entitled "Employing Configuration Information to Determine the Role of a Server in a Coordinated Timing Network," filed Oct. 22, 2007, each of which is hereby incorporated herein by reference in its entirety.

In accordance with an aspect of the present invention, servers within a CTN can operate with different capabilities than other servers of the CTN. As one example, the level of capability of a server includes a level of timing capability for the server, including aspects related to STP timing. These aspects include, for instance, recovery, configuration, time management, formatting of time synchronization messages and/or TOD clock synchronization.

In one example, version numbers are used to determine the capabilities of a server and to indicate to other servers how to communicate with that server. For instance, each server in a CTN (or a subset thereof, in another embodiment) maintains a maximum supported version number and a lowest supported version number that defines the range of STP versions that the server is capable of supporting. The maximum supported version number can be different from or the same as the minimum supported version number. The support of version numbers is pictorially depicted in FIG. 1C, in which, in one example, Server A (180) has a maximum supported version number (VN) of 3 and a minimum version number of 2; Server B (182) supports a maximum version number of 4 and a minimum version number of 1; and Server C (184) supports a maximum version number of 2 and a minimum version number of 1.

Figure 6A:
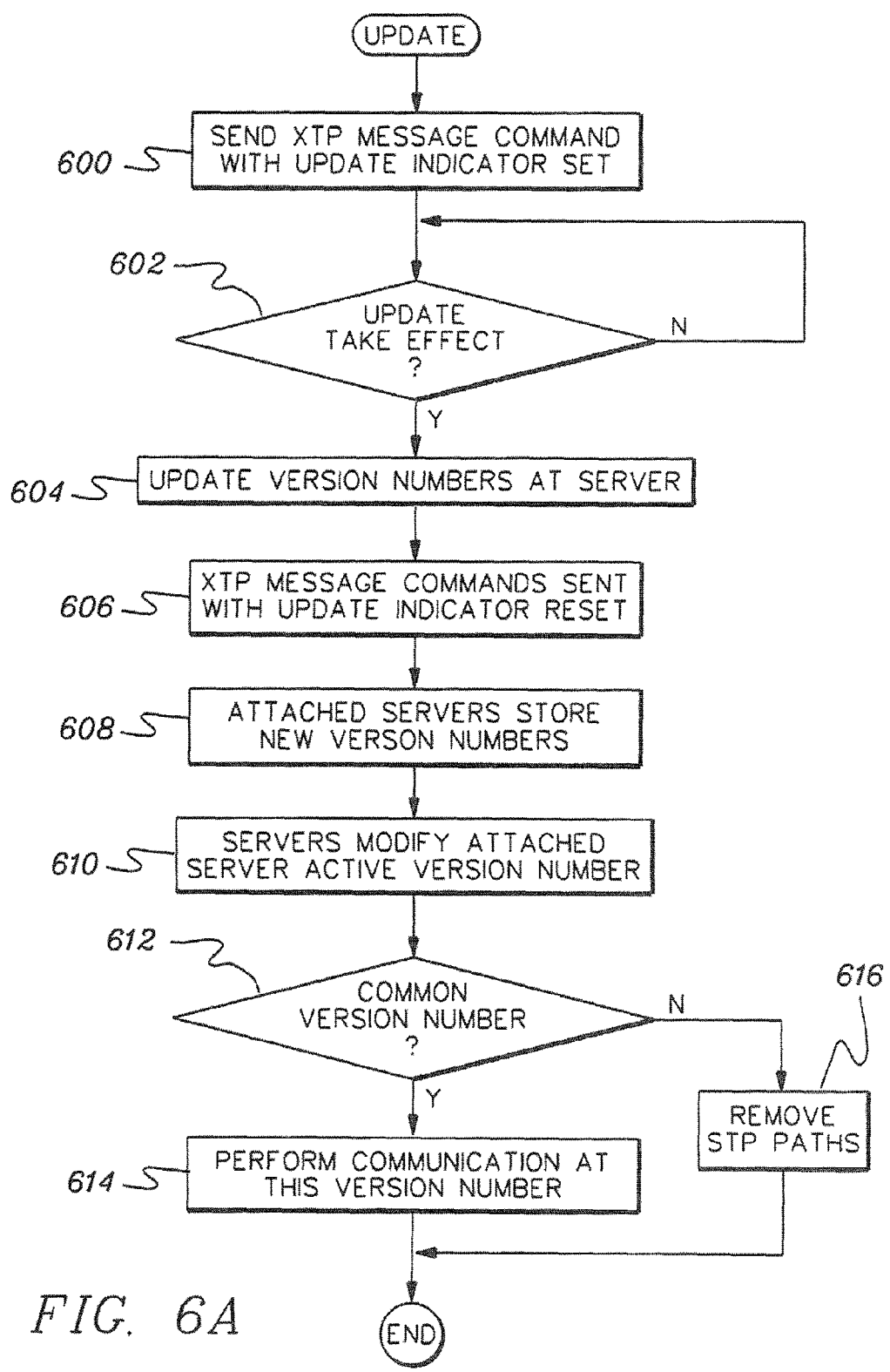
FIG. 6A depicts one example of logic to update one or more version numbers, in accordance with an aspect of the present invention.
Figure 6B:
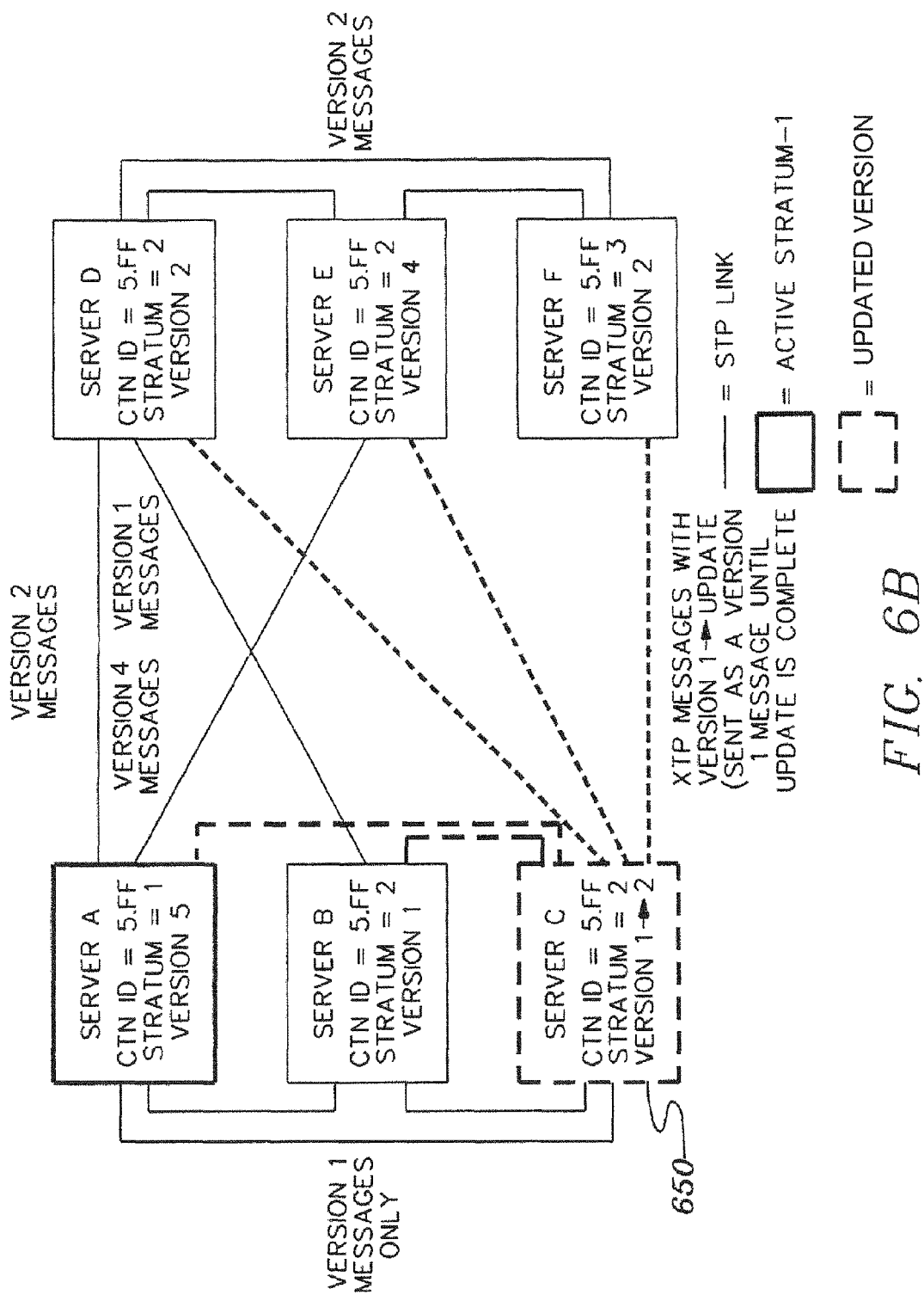
FIG. 6B pictorially depicts one example of a version number update procedure for a server, in accordance with an aspect of the present invention.

When two servers establish an STP path using the establish STP path procedure, described below, each communicates in its ESP message command the range of STP versions supported by each and, as part of the ESP procedure, agree to utilize the highest version supported by each server. A server can communicate with one server at one level and another server at another level. Communication between any two servers that have an established path adheres to the negotiated STP version number. Thus, in the example of FIG. 1C, communication between Servers A and B adheres to negotiated VN=3, and communication between Servers B and C adheres to negotiated VN=2. Another example of servers having version numbers associated therewith and communicating at negotiated version numbers is depicted in FIG. 1D. As shown, a server, such as Server A (190), can communicate with other servers using different version numbers. The version number used is individual for each server with which it communicates. For instance, Server A communicates at version 1 with Servers B and C, version 2 with Server D, and version 4 with Server E. In this example, as well as in the examples described with reference to FIGS. 6B and 6C described below, the version number indicated in the box that includes the server is the maximum version number supported by that server and the minimum supported version number is one, unless stated otherwise.

Each server in the CTN (or a subset thereof) is required to maintain state information for each attached server that includes information describing the level of STP functionality that is to be used for communicating to the attached server. A server is an attached server when, for instance, at least one STP path to that server is in the initialized state.

The maximum supported version number (MSVN) is a value (e.g., 8-bit unsigned, non-zero binary integer) that specifies the highest STP version number supported by the server. A server supports all STP versions starting with the lowest supported version number up to, and including, the MSVN.

For a server operating at stratum level 1 or greater, the MSVN is changed at the server (e.g., via a concurrent maintenance procedure) by performing a version number update procedure, described below. The new MSVN takes effect at the server when the procedure completes.

For a server operating at stratum level 0, the MSVN is changed at the server (e.g., via a concurrent maintenance procedure) by performing the ESP procedure on all STP links to all attached servers with the new MSVN specified in the ESP message command. A server operating at stratum level 0 does not use the version number update procedure to make an MSVN change, in this embodiment.

When the MSVN at a server is modified, the server issues an STP event notification command to the console with the event code set to indicate a version number change. If both the MSVN and LSVN are modified, only one STP event notification command is issued.

As one example, the STP event notification command includes a request block having, for instance: a length field indicating the length of the command block; a command code indicating the event notification command; a command transaction number, which is returned in the response block; and an STP event code, which, in this example, reflects the version number change event. The response block includes, for instance, a length field indicating the length of the response block; a response code that includes the response code for the command; and the command transaction number.

The lowest supported version number (LSVN) is maintained on servers that have an MSVN greater than one, and it is a value (e.g., an 8-bit unsigned, non-zero binary integer) that specifies the lowest STP version number supported by the server. The value is to be equal to or less than the MSVN. A server supports all STP versions starting with the LSVN up to, and including, the MSVN.

For a server operating at stratum level 1 or greater, the LSVN is changed at the server (e.g., via a concurrent maintenance procedure) by performing a version number update procedure. The new LSVN takes effect at the server when the procedure completes.

For a server operating at stratum level 0, the LSVN is changed at the server (e.g., via a concurrent maintenance procedure) by performing the ESP procedure on all STP links to all attached servers with the new LSVN specified in the ESP message command. A server operating at stratum level 0 does not use the version number update procedure to make an LSVN change, in this embodiment.

When the LSVN at a server is modified, the server issues an STP event notification command with the event code set to indicate a version number change. If both the MSVN and LSVN are modified, only one STP event notification command is issued.

In addition to the above, there are an attached server maximum supported version number and an attached server lowest supported version number, as well as an attached server active version number, each of which is described below.

The attached server maximum supported version number (AMSVN) is a value (e.g., an 8-bit, unsigned binary integer) that specifies the highest STP version number supported by the attached server. The value is set based on the ESP message command from the attached server for the first established path out of the set of currently established paths with the attached server or as the result of the version number update procedure.

The attached server lowest supported version number (ALSVN) is a value (e.g., 8-bit, unsigned binary integer) that specifies the lowest STP version number supported by the attached server. When the attached server has an AMSVN equal to one, the ALSVN is equal to one. When the attached server has an AMSVN greater than one, the ALSVN is set based on the ESP message command from the attached server for the first established path out of the set of currently established paths with the attached server or as the result of the version number update procedure.

The attached server active version number (AAVN) is maintained by servers that support a MSVN greater than 1 and is a value (e.g., an 8-bit, unsigned binary integer) that specifies the STP version number that is used to communicate with an attached server. A server may use different STP version numbers to communicate with different attached servers.

The AAVN is set to the highest version number supported by both this server and the attached server, as determined using the range of the LSVN to MSVN and the range of the ALSVN to AMSVN. A change in any of these values may result in a change to the AAVN. When a common, supported version number does not exist between two servers, the AAVN is set to zero.

As noted herein, when two servers establish an STP path using the establish STP path (ESP) procedure, each server communicates in its ESP message command the range of STP versions it supports and, as part of the ESP procedure, agree to utilize the highest version supported by each server. Communication between any two servers that have an established path adheres to the negotiated STP version number.

Figure 1B:
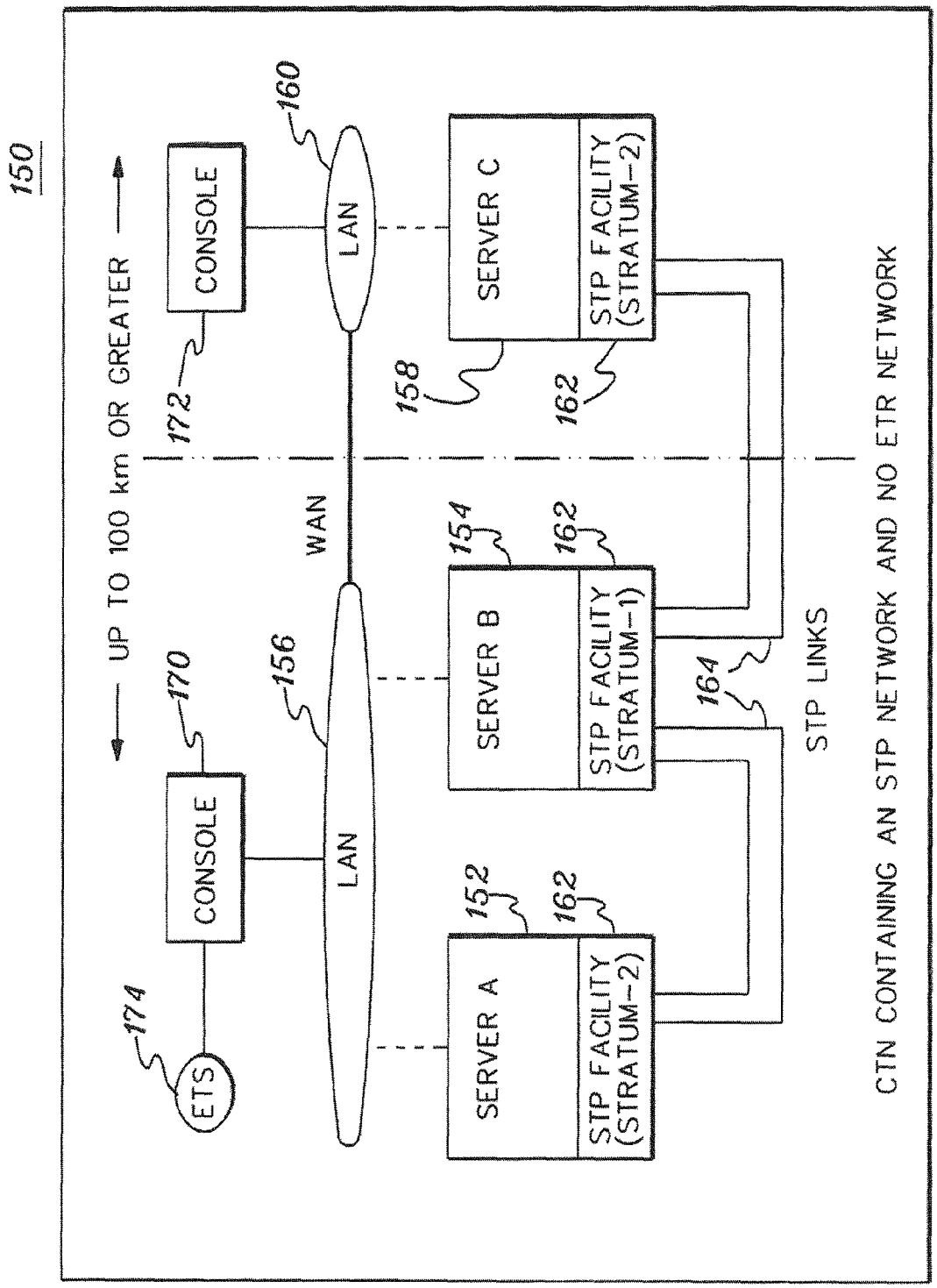
FIG. 1B depicts one example of an STP-only network to incorporate one or more aspects of the present invention.
Figure 1C:
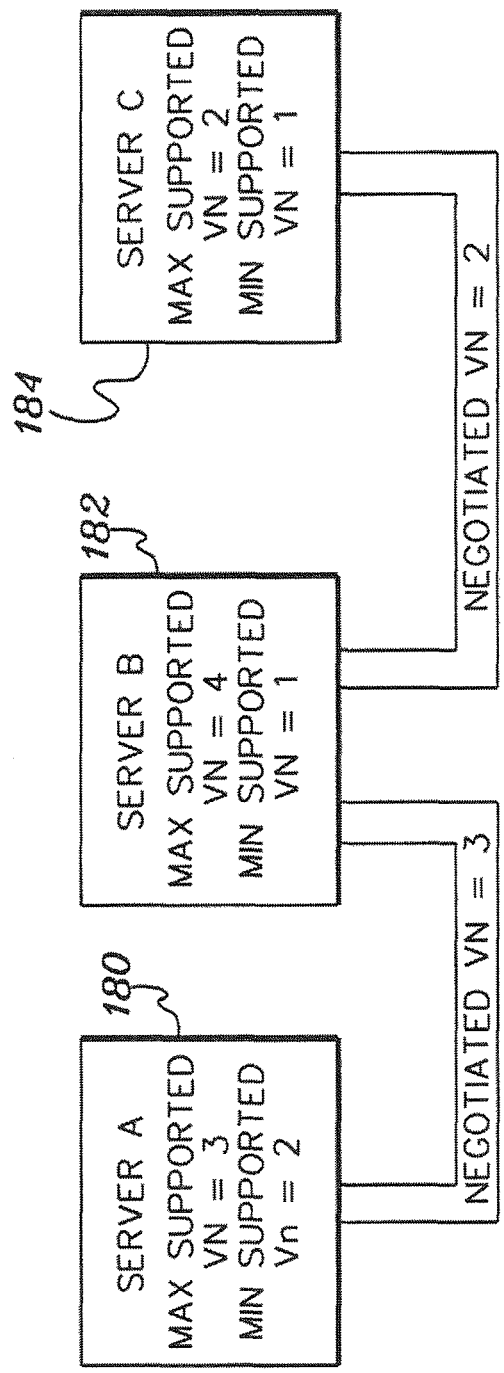
FIG. 1C depicts one example of servers of a network having version numbers assigned thereto, in accordance with an aspect of the present invention.
Figure 1D:
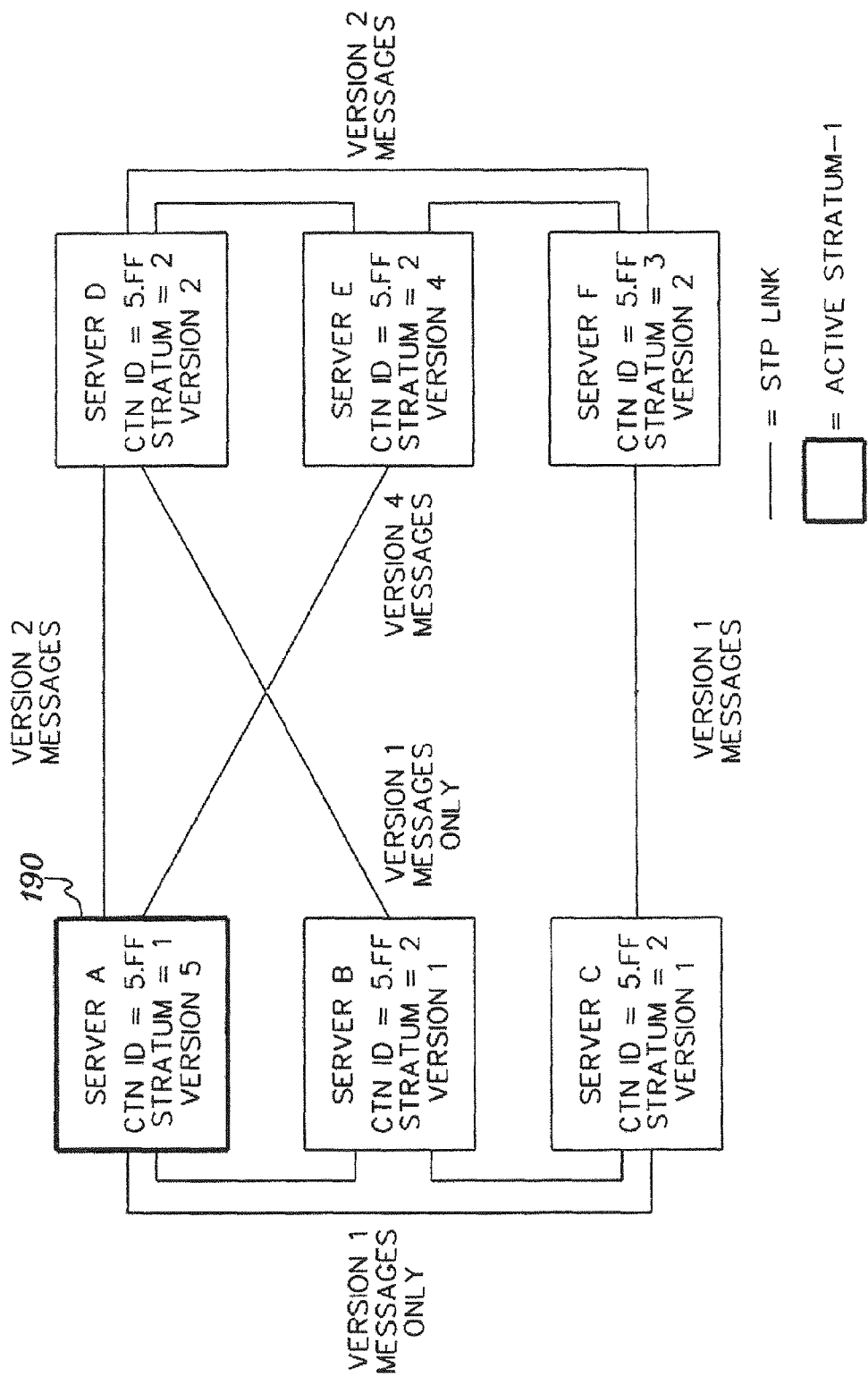
FIG. 1D depicts one example of servers of a network using version numbers to communicate with other servers of the network, in accordance with an aspect of the present invention.
Figure 4:
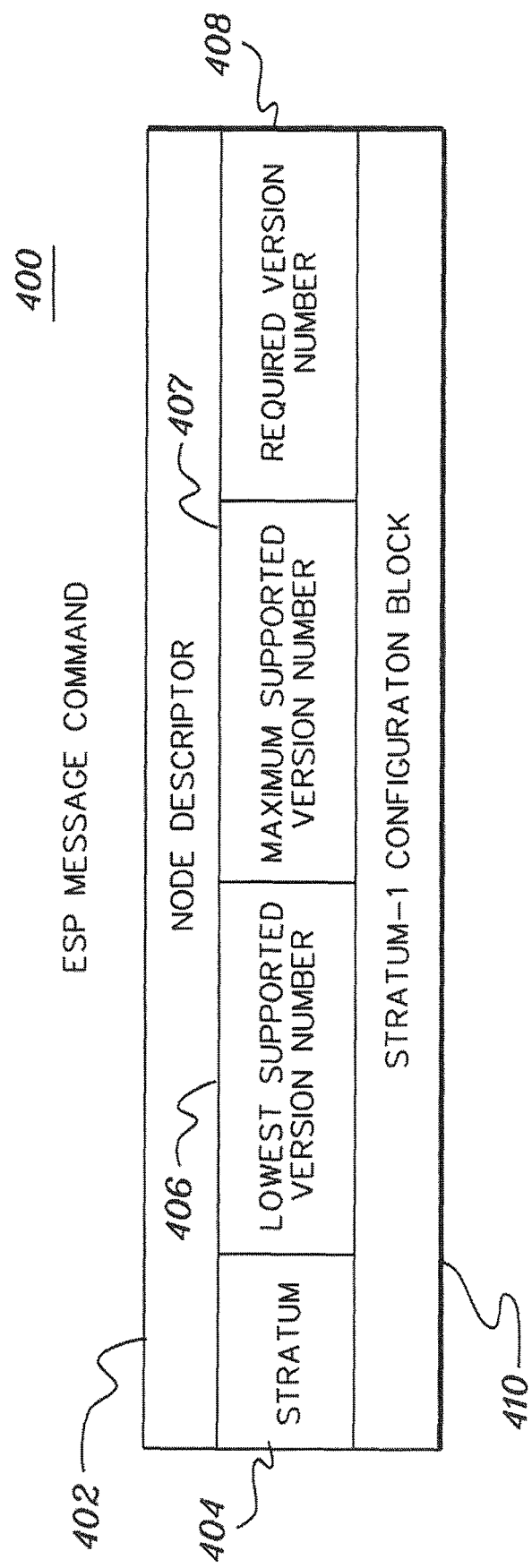
FIG. 4 depicts one embodiment of a message command operation dependent area for an establish STP path operation, in accordance with an aspect of the present invention.

The ESP procedure is performed as part of the STP path initialization procedure to establish a path between two servers (e.g., a path between Server B and Server C of FIG. 1A-FIG. 1C). The ESP procedure is used to exchange and validate certain parameters associated with each of the attached servers. Associated with the ESP procedure is a message command operation dependent area, an example of which is described with reference to FIG. 4. As one example, a message command operation dependent area 400 includes:

a) Node Descriptor 402: This field includes the CPC node descriptor of the server sending the command.
b) Stratum 404: This field includes the stratum level of the server sending the command.
c) Lowest Supported Version Number 406: When the MSVN of the server sending the ESP message command is greater than one, this field is set to the lowest supported version number (LSVN) for the server sending the command or, if a version number update is pending at the server, is set to the new lowest supported version number (NLSVN). When the MSVN of the server issuing the ESP message command is one, this field is reserved and set to zero.
d) Maximum Supported Version Number 407: This field is set to the maximum supported version number (MSVN) of the server sending the command or, if a version number update is pending at the server, is set to the new maximum supported version number (NMSVN).
e) Required Version Number 408: This field specifies the STP version number that is to be used for communication between the two servers. When the value is zero and the MSVN of the server sending the ESP message command is greater than one, the server sending the command is able to operate at any version from the LSVN up to and including the MSVN. When the MSVN of the server sending the ESP message command is one, the server sending the command operates at version one regardless of the state of this field.
f) Stratum-1 Configuration Block 410: This field includes the stratum-1 configuration block for the server sending the message command.

The ESP message response block does not have any operation-dependent data. The following example responses are valid for the operation:

Successful: The message command was successfully performed.

STP Not Enabled: The STP facility is installed, but not enabled at the attached server.

Busy: The message command cannot be performed at this time due to busy conditions or resource contention.

Invalid Operation Parameters: The message command contains invalid parameters.

Configuration Error: The message command contains a mismatched CTN ID.

Node Descriptor Error: The node descriptor in the ESP message command is invalid. The node descriptor value provided in the message command is stored in the link information block at the receiving server.

Unsupported Version: The required version number in the ESP message command is not supported by the receiving server. The required version number provided in the message command is stored in the link information block at the receiving server.

Stratum-1 Configuration Error: The stratum-1 configuration information block in the ESP message command is not compatible with the stratum-1 configuration at the receiving server.

Self-Coupled Server: The node descriptor of the attached server is identical to the node descriptor of this server, indicating that this server is coupled to itself.

Takeover-Active State: The arbiter received an ESP command from the primary stratum-1 server while the arbiter was in the takeover-active state and the primary specified itself as the active stratum-1 server.

Allowable Paths Exceeded: The server cannot support any additional STP paths.

CF Response: The response codes indicate that the STP facility is not supported at the attached server.

In one example, the data in the ESP message command is verified to confirm that it permits path initialization. As an example, the verification is performed by an ESP verification function, which is invoked by the receiving server, in response to receiving the message command. ESP is performed simultaneously in both directions and both messages are to be completed successfully for the link to be marked usable. Verification is done on each server when the ESP message comes in from the other server and when the ESP response is returned.

Figure 5:
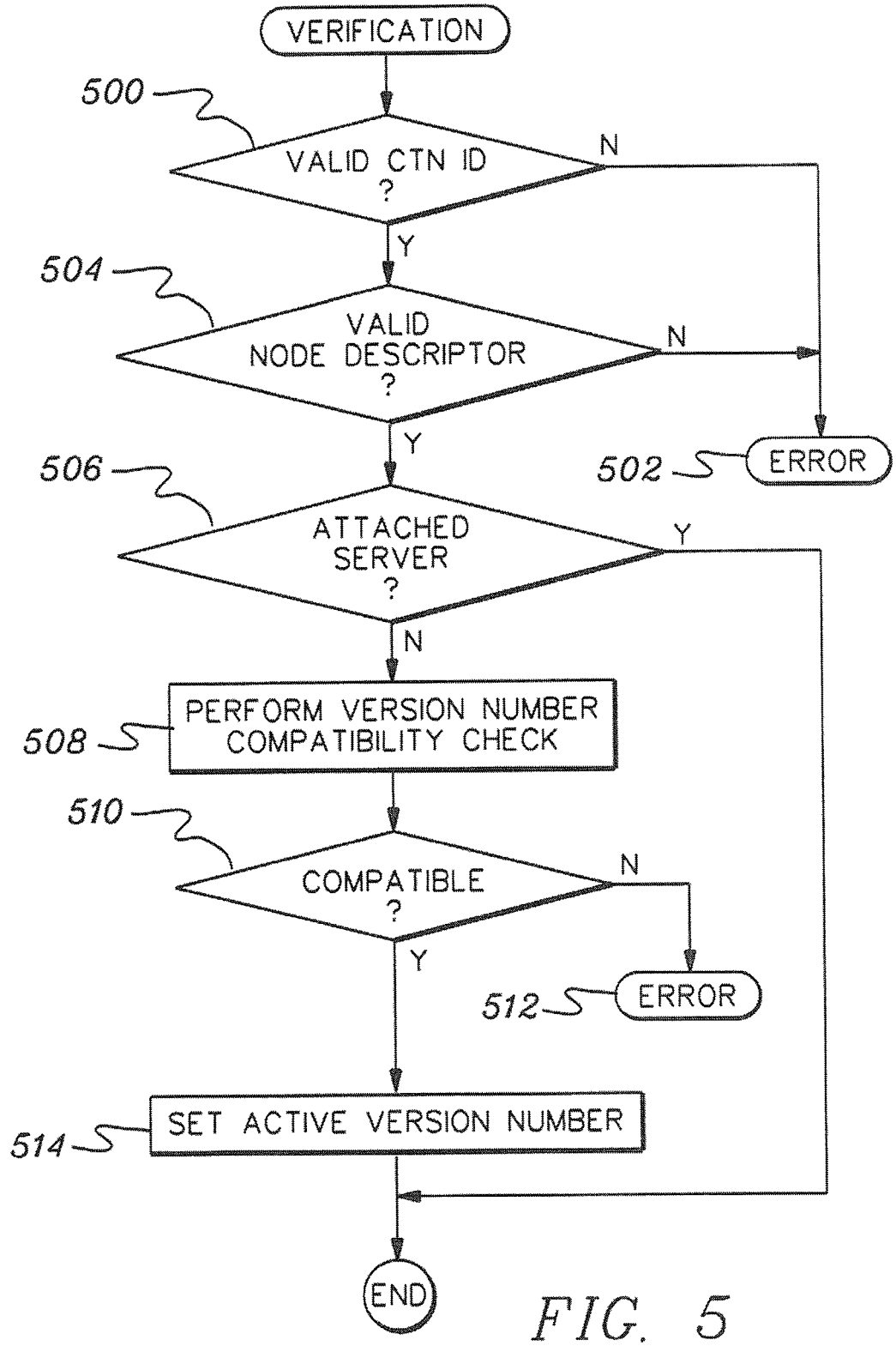
FIG. 5 depicts one example of logic to verify an establish STP path function, in accordance with an aspect of the present invention.

One embodiment of the ESP verification function is described with reference to FIG. 5. Initially, a determination is made as to whether the CTN ID received in the ESP message command matches that of the server, INQUIRY 500. If the CTN ID does not match that of the server, the configuration error response code is returned in the response block and the ESP procedure fails, STEP 502. In one example, the response code is stored in the STP link information block (LIB), described below, and the URC is set to the incoming ESP command reject state.

Returning to INQUIRY 500, if the CTN ID received in the ESP message command does match that of the server, then a further determination is made as to whether the node descriptor in the ESP message command is valid, INQUIRY 504. If the node descriptor is invalid, then a node descriptor error response code is returned in the response block and the ESP procedure fails, STEP 502. As one example, the response code is stored in the LIB and the URC is set to the incoming ESP command reject state.

If both the CTN ID and the node descriptor are valid, then a further determination is made as to whether the ESP message command is received from a server that is an attached server, INQUIRY 506. If it is received from an attached server, then the verification is complete. However, if the ESP message command is not received from an attached server, then a version number compatibility check is performed, STEP 508. This includes, for instance, comparing version numbers in the ESP message with that of the receiving server. If the version number information provided in the ESP message command is not compatible with the version number information at the receiving server, INQUIRY 510, the unsupported version number response code is returned in the ESP response block and the ESP procedure fails, STEP 512. In one example, the response code is stored in the LIB with the URC set to the incoming ESP command reject state.

When the version number information provided in the ESP message command is compatible with the version number information at the server receiving the command, the active version number is set at the receiving server for communication with the sending server, as described below, STEP 514. The version number information provided in the ESP message command is compatible with the version number information at the server receiving the command when any of the following are true:

Both servers have a required version number equal to zero and have a common, supported version number as indicated by the MSVN and LSVN at both servers. The server receiving the command sets the version number for communicating with the attached server to the highest version number supported by both servers.

The required version numbers are non-zero and equal to each other. The server receiving the command sets the version number for communicating with the attached server to the required version number.

The required version number in the ESP message command is non-zero, the receiving server's required version number is zero, and the receiving server is capable of supporting the required version number specified in the ESP message command. The server receiving the command sets the version number for communicating with the attached server to the required version number specified in the ESP message command.

The required version number in the ESP message command is zero, the receiving server's required version number is non-zero, and the sending server indicates it is capable of supporting the required version number of the receiving sender. The server receiving the command sets the version number for communicating with the attached server to its required version number.

To update a version number such as the MSVN, the LSVN or both, a version number update procedure is used. The version number update procedure is used by a server to notify the attached servers that the MSVN, the LSVN or both have changed at the server. The procedure makes use of the XTP message command to notify each attached server of the change. The change may result in a change in the attached server active version number used by the server and an attached server. One embodiment of the logic to update one or more version numbers is described with reference to FIG. 6A.

In one example, a server initiates an update procedure by sending an XTP message command with the version number update indicator equal to one to all attached servers, STEP 600. The command request block includes the new MSVN and/or LSVN values, and a version number update time stamp to indicate when the change is to take effect. The version number update time stamp is set equal to the time at which the initial XTP message command, including the version number update information is sent plus, for instance, a maximum CTN freewheel interval. When the version number update takes effect at a server, INQUIRY 602, the version number update is considered to have completed. (Details regarding the freewheel interval are described in U.S. Ser. No. 11/468,352, entitled "Coordinated Timing Network Configuration Parameter Update Procedure," Carlson et al., filed Aug. 30, 2006, which is hereby incorporated herein by reference in its entirety.)

The version number update indicator is set to one and version number update information is provided in all XTP message commands to attached servers by the server initiating the version number update until the update has completed. A server that has sent an XTP message command specifying a version number update does not initiate a new version number update until the preceding update has completed.

When a server has one or more attached servers, it may receive a schedule from a server to perform a version number update. Version number update information and update timestamps are therefore maintained on an attached server basis.

Figure 6C:
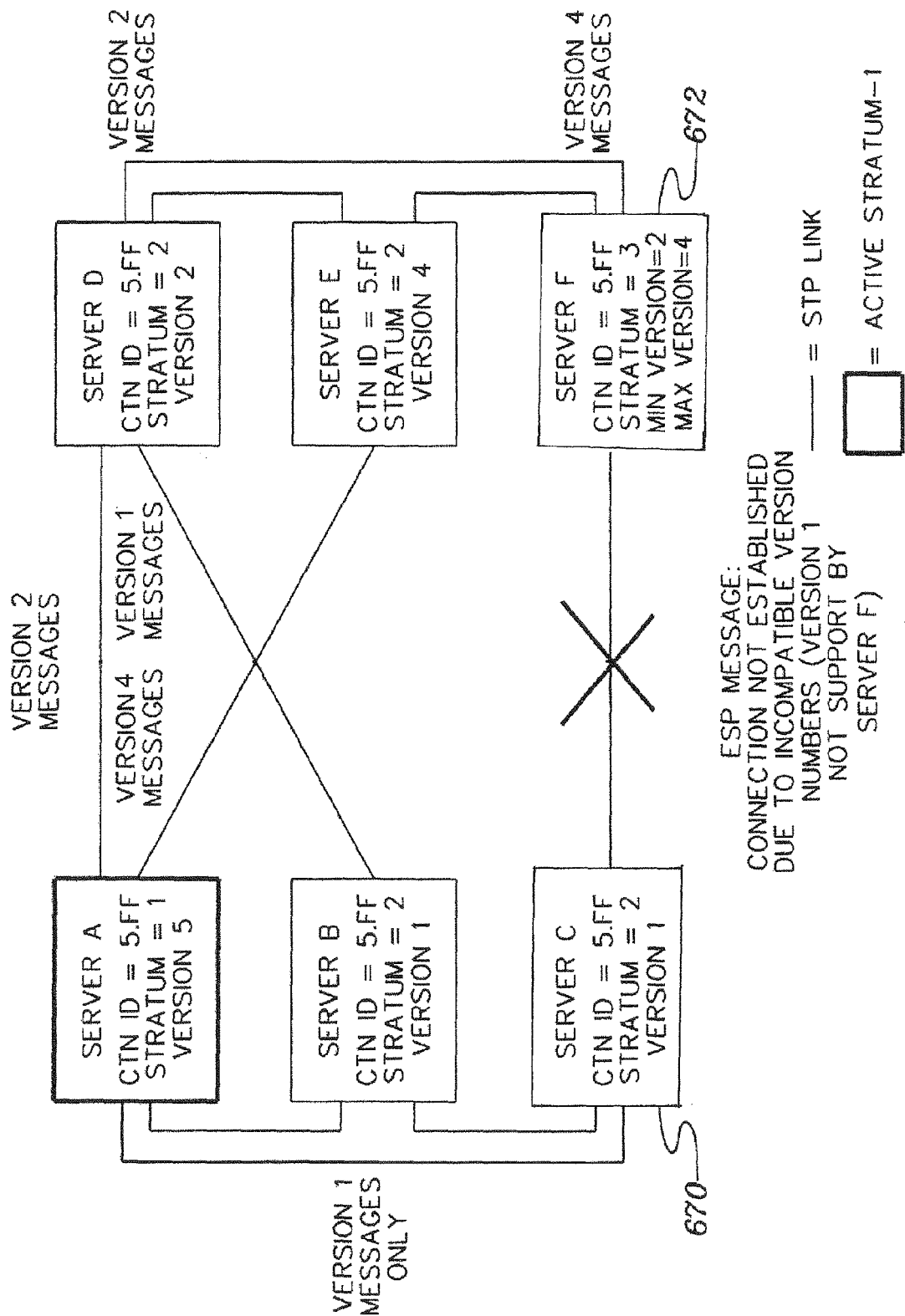
FIG. 6C pictorially depicts one example in which a connection is not established because of incompatible version numbers between servers, in accordance with an aspect of the present invention.

When the version number update takes effect, the server that initiated the version number update makes the new MSVN and/or LSVN current at the server, STEP 604, and sends XTP message commands with the version number update indicator equal to zero until another version number update is performed by the server, STEP 606. Each attached server stores the new MSVN and/or new LSVN into the corresponding maximum and lowest version number fields in the link information block for each established path to the server, STEP 608. The originating server and each attached server modifies the attached server active version number, if necessary, to the highest version number supported by both servers, STEP 610. If there is a common version number between the originating server and an attached server, INQUIRY 612, all communications between the servers are performed at this common version number, STEP 614. This is pictorially shown in the example of FIG. 6B. As depicted, the version number associated with Server C (650) has been updated from 1 to 2. Now, it can communicate with Servers A, D, E and F at version 2, and Server B at version 1. However, if the servers do not have a common supported version number, the servers remove all STP paths to each other, STEP 616. This is shown in the example of FIG. 6C, in which Server C (670) has a version number of 1, which is not supported by Server F (672). Thus, the connection between Servers C and F is not established. Server F supports version numbers between and including 2-4, as indicated by the minimum and maximum versions. This concludes the version number update procedure.

As described above, the exchange time parameters (XTP) commands are used in the version number update procedure, as well as for other communications. Again, server time protocol (STP) messages are transmitted over STP paths between two servers in the form of a message command and a message response. A message command is sent from a server to an attached server; and an STP message response is sent from a server to an attached server in response to a message command received from the attached server. The message response is sent to the attached server on the link from which the message command was received. As used herein, a server sending a message command is referred to as the message originator, while a server receiving a message command is referred to as the message recipient. A message command includes a message command code that indicates the type of message being transmitted. For example, the STP message command codes may support:

Exchange Time Parameters (XTP) Messages; and
STP Control (STC) Messages.

The message response includes a response code that describes the result of the attempt to execute the message command. General responses are defined below. Not all responses apply to all message commands. Additional command-dependent responses may be defined for individual commands. When multiple response conditions can be detected concurrently, the lowest numbered response code may be reported.

Command Codes:
Successful: The message command was successfully performed.
STP Not Enabled: The STP facility is installed, but not enabled at the attached server.
Busy: The message command cannot be performed at this time due to busy conditions or resource contention.
Invalid Operation Parameters: The message command contains invalid parameters.
Configuration Error: The message command contains a mismatched CTN ID.
Path Not Established: The path is not established at the attached server.
CF Response: Indicates that the STP facility is not supported at the attached server.

The exchange time parameters (XTP) message is used to exchange, for instance, timestamps, time keeping information, CTN-parameter information and version number update information between two directly attached servers. The information in the message response is used by the message originator to calculate the round-trip delay, offset, and dispersion values that are used by STP clock filtering and selection algorithms to select a clock source. It is also used to set CTN time keeping parameters and ensure synchronization of the attached servers.

XTP-transmit procedures are used to transmit XTP message commands, and XTP-receive procedures are used to receive XTP messages. Further information regarding Server Time Protocol messages are described below, as well as in U.S. Ser. No. 11/940,518, entitled "Server Time Protocol Messages and Methods," filed Nov. 15, 2007, which is hereby incorporated herein by reference in its entirety.

Figure 7A:
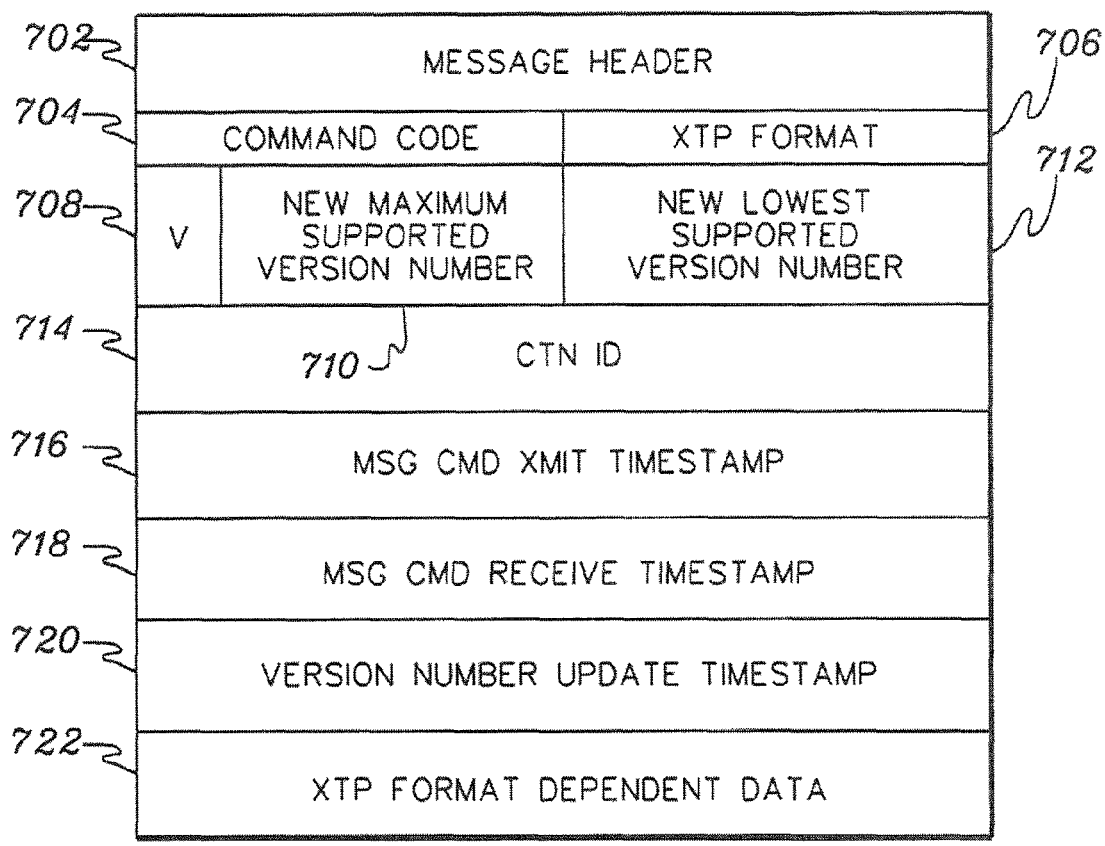
FIG. 7A depicts one embodiment of an XTP message command format, in accordance with an aspect of the present invention.
Figure 7B:
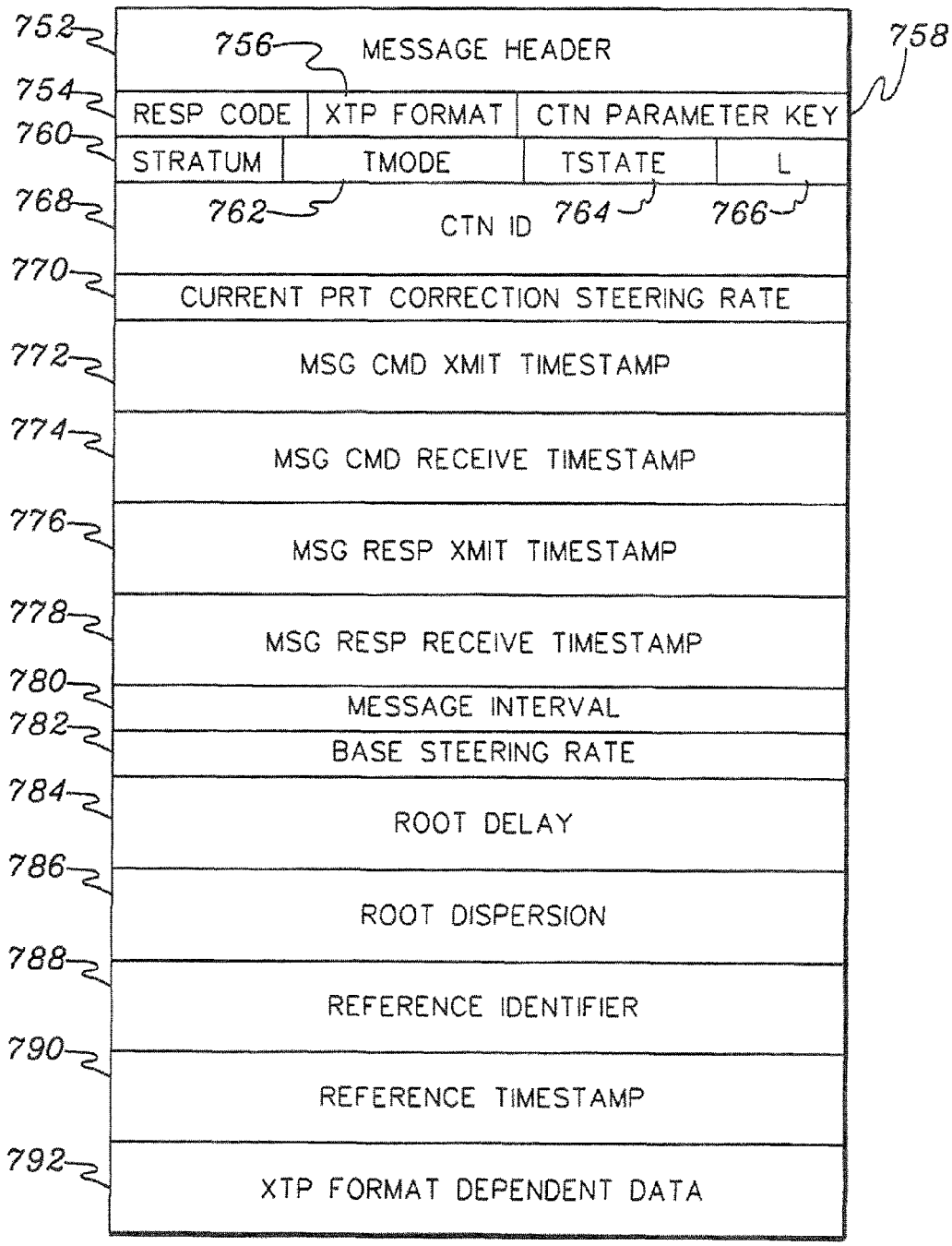
FIG. 7B depicts one embodiment of an XTP message response format, in accordance with an aspect of the present invention.

One XTP message command format is depicted in FIG. 7A. As shown, an XTP message command format 700 includes, for instance:

a) Message Header 702: This field includes information that is dependent on the type of data link that is used to implement the STP link;
b) Command Code 704: This field includes an indication of the particular XTP message command;
c) XTP format 706: This field includes a value that specifies the format of the format dependent area in the message command. This value might be set to zero for message commands;
d) Version Number Update (V) 708: This field, when set to one, indicates the XTP message command is a version number update request and the MSVN and LSVN in the XTP message command include valid information. When this field is zero, the MSVN and LSVN fields do not include valid information. The V bit shall not be set to one in XTP message commands sent by a server operating at a stratum level 0 and shall not be set to one in XTP message commands sent to a server operating at stratum level 0;
e) New Maximum Supported Version Number (NMSVN) 710: This field is valid when the V field is one, and when valid, includes the MSVN for the sending server that is to take effect at the time specified by the version number update timestamp in the XTP message command. When the V field is zero, this field is meaningless;
f) New Lowest Supported Version Number (NLSVN) 712: This field is valid when the V field is one, and when valid, includes the LSVN for the sending server that is to take effect at the time specified by the version number update timestamp in the XTP message command. When the V field is zero, this field is meaningless;
g) CTN ID 714: This field is set to the CTN ID of the server sending the message command, i.e., the originating server;
h) Message command transmit timestamp 716: This field is set to the time of day (TOD) clock at the originating server at the time the message is transmitted over the STP path by the server;
i) Message command receive timestamp 718: This field is set by the receiving server;
j) Version Number Update Timestamp (VNUTS) 720: This field includes a timestamp that is set equal to the TOD clock at the time the initial version number update request was sent plus the CTN maximum freewheel interval. The timestamp specifies the time at which the version number is to take effect; and
k) XTP Format Dependent Data 722: This field is set to zero for an XTP message command;

FIG. 7B depicts one embodiment of an XTP message response format 750. In this format, the fields are defined as follows:

a) Message Header 752: This field includes information that is dependent on the type of data link that is used to implement the STP link employed.
b) Response Code 754: This field describes the results of the attempt to execute the message. Valid response codes may include:
1) Successful: The message command was successfully performed.
2) STP Not Enabled: The STP facility is installed, but not enabled at the attached server.

3) Configuration Error: The message command contains a mismatched CTN ID.
4) Path Not Established: The path is not established at the attached server.
5) CF Response: An indication that the STP facility is not supported at the attached server.

c) XTP Format 756: This field specifies the format of the format dependent area in the message response, which by way of example, may comprise valid values of 0, 1 and 2.

d) CTN Parameter Key 758: This field indicates whether the contents of the format-dependent-area have changed. The field is only valid in STP-only CTNs. In a mixed-CTN, the field is meaningless and ignored. The active-stratum-1 server increments the CTN parameter key whenever it changes the format used in the XTP message response or when it changes any value in the data sent in the format dependent data area. A secondary-time server sets the CTN Parameter Key to the value it received in the last XTP message response from its current clock source, or, if it does not have a clock source, to the same value it sent in its last XTP message response. The initialized value is zero, and the field wraps to zero.

e) Stratum 760: This field is set to the stratum level of the server sending the message response.

f) Timing Mode 762: This field is set to the timing mode code of the server sending the message response.

g) Timing State 764: This field is set to the timing state code of the server sending the message response.

h) Local Clock Server (L) 766: This field specifies whether the server sending the message response is configured as a local-clock server.

i) CTN ID 768: This field is set to the CTN ID of the server sending the message response.

j) Current PRT Correction Steering Rate 770: This field includes the current PRT correction steering rate for the CTN. In XTP message responses sent by the stratum-1 server, it contains the PRT correction steering rate that was in effect at the time the message was sent. In XTP message responses sent by secondary servers, the field is set to the value received in the most recent XTP message response received from the clock source for the server. The PRT correction steering rate (PCSR) is used to correct an accumulated error between the current TOD clock at the active stratum-1 server and the primary reference time. In a mixed CTN, the PCSR is set to zero.

k) Message Command Transmit Timestamp 772: This field is set to the incoming message command transmit timestamp.

l) Message Command Receive Timestamp 774: This field is set to the incoming message command receive timestamp.

m) Message Response Transmit Timestamp 776: This field is set to the TOD clock of the server sending the message response at the time the message is transmitted.

n) Message Response Receive Timestamp 778: This field includes the timestamp of the time at which the message response is received by the attached server. The field is set from the TOD clock at the server receiving the message response when the message response is received.

o) Message Interval 780: This field is set to the outgoing message interval field from the attached server time keeping parameters set at the sending server.

p) Base Steering Rate 782: This field is set to the base steering rate of the server sending the message response.

q) Root Delay 784: This field is set to the CST round trip delay at the server sending the message response.

r) Root Dispersion 786: This field is set to the CST clock dispersion at the server sending the message response.

s) Reference Identifier 788: This field is set to the CST reference ID at the server sending the message response.

t) Reference Timestamp 790: This field is set to the CST reference timestamp at the server sending the message response. The timestamp is in STP timestamp format.

u) XTP Format Dependent Data 792: This field is set based on the format field.

Figure 8A:
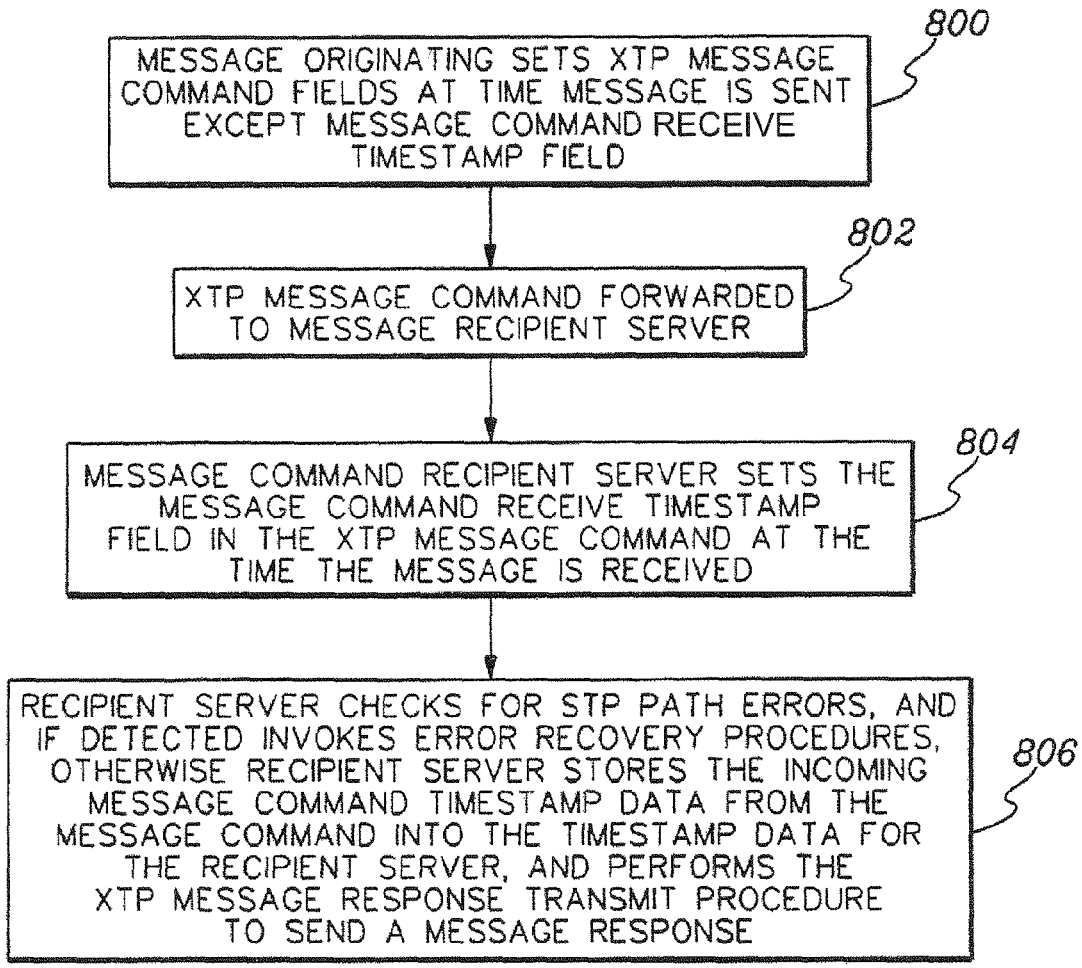
FIG. 8A depicts one example of logic associated with sending an XTP message command, in accordance with an aspect of the present invention.

As described in the example of FIG. 8A, the STP facility at the server sending an XTP message command sets all relevant fields in the message command, except for the message command receive timestamp field, STEP 800. The XTP message command fields are set by the message originating server at the time the message is sent. The XTP message command is forwarded to an attached server, that is, the message recipient server, STEP 802. The command message recipient server sets the message command receive timestamp field in the XTP message command at the time the message is received at that server, STEP 804. The message command receive timestamp field is set from the time of day (TOD) clock at the recipient server when the message command is received. Again, at the time the XTP message command was transmitted from the originating server, the message command receive timestamp field was undefined.

The message recipient checks for STP path error, and if detected, invokes error recovery procedures. Otherwise, the recipient server stores the incoming message command timestamp data from the message command into the timestamp data for the recipient server, and performs an XTP message response transmit procedure to generate and send a message response, STEP 806.

Figure 8B:
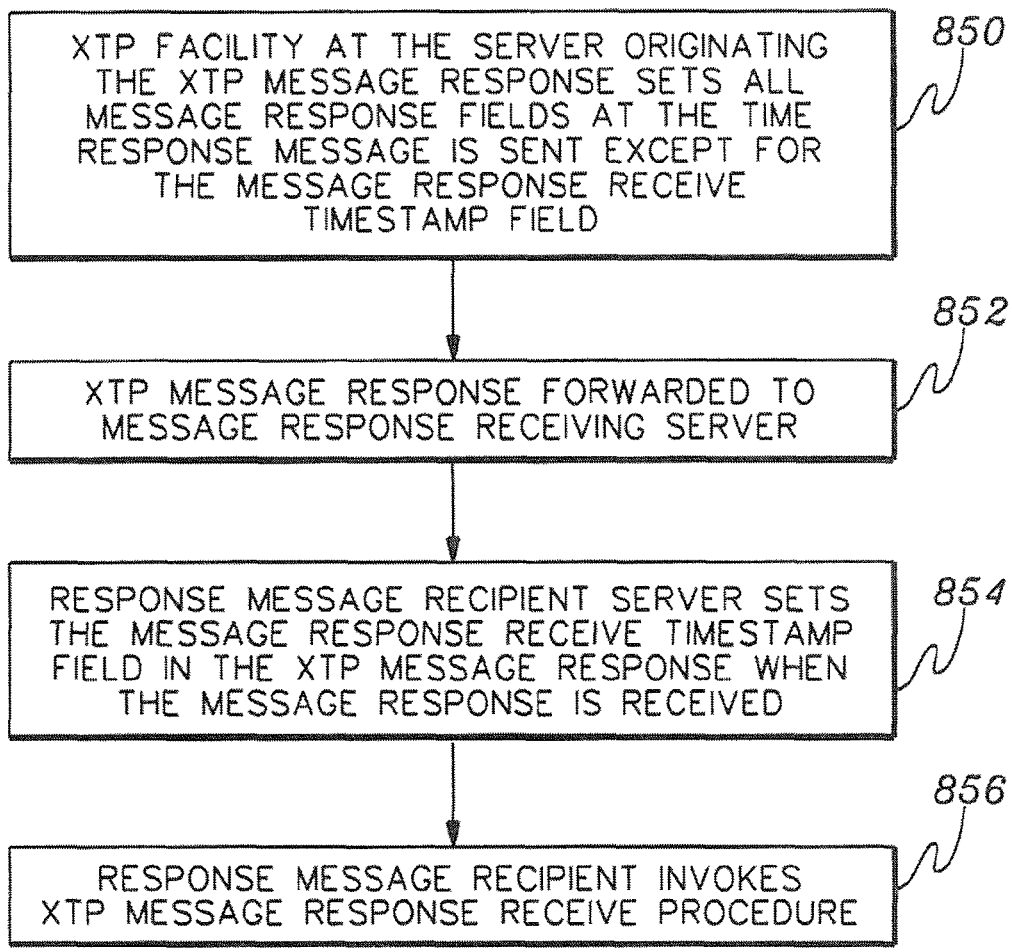
FIG. 8B depicts one example of logic associated with receiving an XTP message command, in accordance with an aspect of the present invention.

FIG. 8B depicts one embodiment of a protocol for generating and handling an XTP message response. The STP facility receiving the XTP message command, that is, the server originating the XTP response message, sets all message response fields at the time the response message is to be sent, except for the message response receive timestamp field, STEP 850.

The XTP message response is forwarded to a message response receiving server, STEP 852, which is the attached server originating the XTP message command. The attached server sets the message response receive timestamp field in the XTP message response when the message response is received, STEP 854, and invokes an XTP message response received procedure, STEP 856.

The message response received procedure includes, for instance, checking for an STP path error, and if an error is detected, initiating an error recovery procedure. If no STP path error is detected, then the procedure stores the incoming message command timestamp data from the message command into the timestamp data for the attached server. The message response is then sent.

Figure 9:
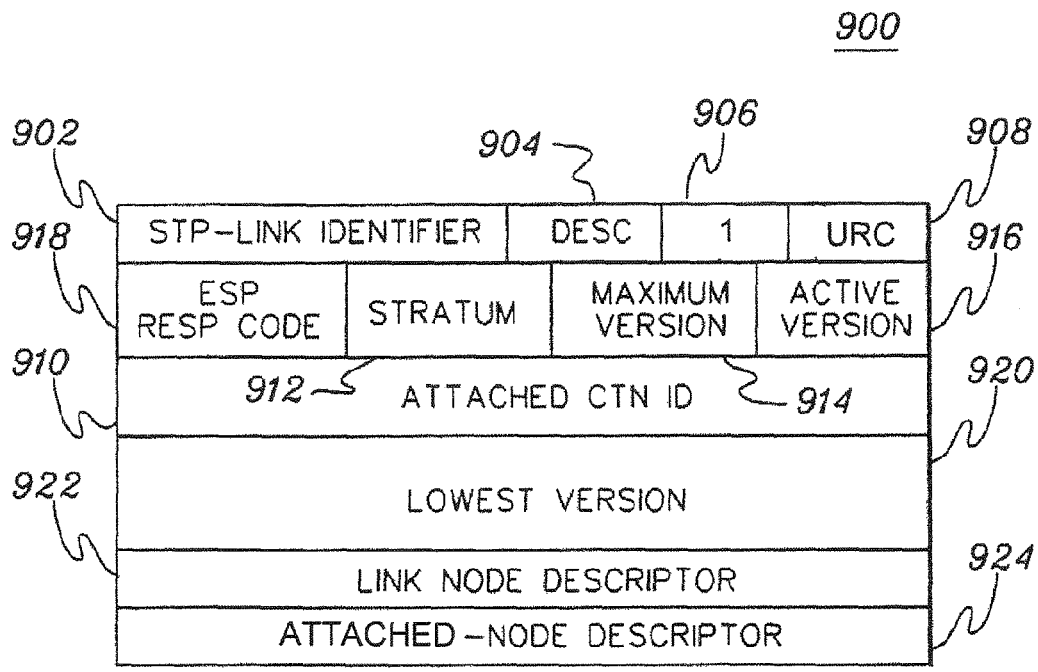
FIG. 9 depicts one embodiment of a link information block, in accordance with an aspect of the present invention.

As indicated above, the updated version numbers are stored in a link information block for each established path to the server. One embodiment of a link information block (LIB) 900 is described with reference to FIG. 9. As one example, link information block 900 includes, for instance:

a) STP-Link Identifier (SLID) (902): This field includes the identifier for the STP link being described by this STP link information block. Each STP capable link in a CPC has a unique SLID that is assigned by the STP facility.

b) DESC (904): This field includes a code which describes the STP link type for the link being described by this link information block. The codes are defined as follows, in one example:

| Hex Code | Meaning |
| --- | --- |
| 00 | Reserved |
| 01 | Coupling-peer link |
| 02 | Infiniband link |
| 03-FF | Reserved. | c) Initialized (I) (906): This field, when set to one, indicates that the STP path is in the STP initialized state and is available for STP messaging. When the bit is zero, the STP path is in the STP uninitialized state. The uninitialized reason code specifies the reason that the path is uninitialized.

d) Uninitialized Reason Code (URC) (908): This field is valid when the STP path for this link is in the uninitialized state and includes, for instance, a 5-bit code that indicates the reason that the path is in the uninitialized state. The codes are defined below and are in order of decreasing priority. The code stored for a path represents the most recent condition recognized for the path. When multiple conditions can be detected concurrently, the higher priority condition is reported.

| Hex Code | |
| --- | --- |
| 0 | Offline: The physical link is in the offline state. A link in the offline state cannot be initialized for STP communication and is considered not operational. |
| 1 | Initialization Not Complete: The physical link is operational but path initialization has not be attempted or is in progress but has not entered states X'E' or X'F'. |
| 2 | Link Failure: A link failure has been detected on the physical link. A link in the link failure stae cannot be initialized for STP communication and is considered not operational. |
| 3 | Fenced: The link is operational but has been put into the fenced state and cannot be initialized. A link in the fenced state cannot be initialized for STP communication and is considered not operational. |
| 4 | Incoming ESP Command Reject: The server responded to an ESP message command with a response code other than 0001 hex. The response code sent to the attached server is stored in the ESP Response Code, described below. |
| 5 | Outgoing ESP Command Reject: The server received a response code of other than 0001 hex to an ESP message command. The response code that was received from the attached server is stored in the ESP Response Code. |
| 6 | Communication Error: A communication error has been recognized for the attached server indicating that the attached server has not communicated with the server for a period greater than the freewheel period. |
| 7 | Configuration Error: A configuration error has been recognized for the attached server indicating the attached server has provided a mismatched CTN ID on one of the paths to the attached server. |
| 8 | Removed Path: A remove STP path command has been received from the attached server. |
| D | No Response: An ESP command has been attempted but did not receive a response within the message timeout period. |
| E | Incoming ESP Command Pending: The server has received a response code of 0001 hex for an ESP command sent to the attached node and is waiting for an ESP command from the node to complete the path initialization process. |
| F | Outgoing ESP Command Pending: The server has responded with a response code of 0001 hex to an ESP command from the attached node and must send an ESP command to the node to complete the path initialization process. | e) ESP Response Code (910): This field includes a model dependent ESP response code when the URC contains code 4 or 5.

f) Stratum Level (912): This field includes the stratum level of the attached server.

g) Maximum Version (914): This field includes a value (e.g., an unsigned binary integer) that specifies the highest STP version number currently active at the attached node.

h) Active Version (916): When the maximum version field is equal to one, this field is a value (e.g., an unsigned binary integer) that specifies the STP version number currently active at the attached server. When the maximum version field is greater than one, this field specifies the STP version number being used by this server to communicate with the attached server on this link.

i) Attached CTN ID (918): This field includes the CTN ID of the attached CPC as reported by the attached CPC on the STP link. The field contains valid data when the I bit equals one or the URC field contains a value of 7.

j) Lowest Version (920): When the maximum version field is equal to one, this field is set to zero and the implied lowest version number supported by the attached server is one. When the maximum version field is greater than one, this field includes a value (e.g., an unsigned binary integer) that specifies the lowest version number supported by the attached server.

k) Link Node Descriptor (922): The link node descriptor contains a CPC type node descriptor of the link being identified by this link information block.

l) Attached Node Descriptor (924): The attached node descriptor contains a CPC type node descriptor of the node attached to the STP link.

In addition to the above, several other commands also provide support for the maximum/lowest supported version number of a server. These commands include request server state, exchange server state and write server state, which are used during, for instance, recovery operations. Recovery is further described in U.S. Ser. No. 12/100,660 entitled "Failsafe Recovery Facility in a Coordinated Timing Network," filed herewith, which is hereby incorporated herein by reference in its entirety. Each of these commands is described below.

Figure 10A:
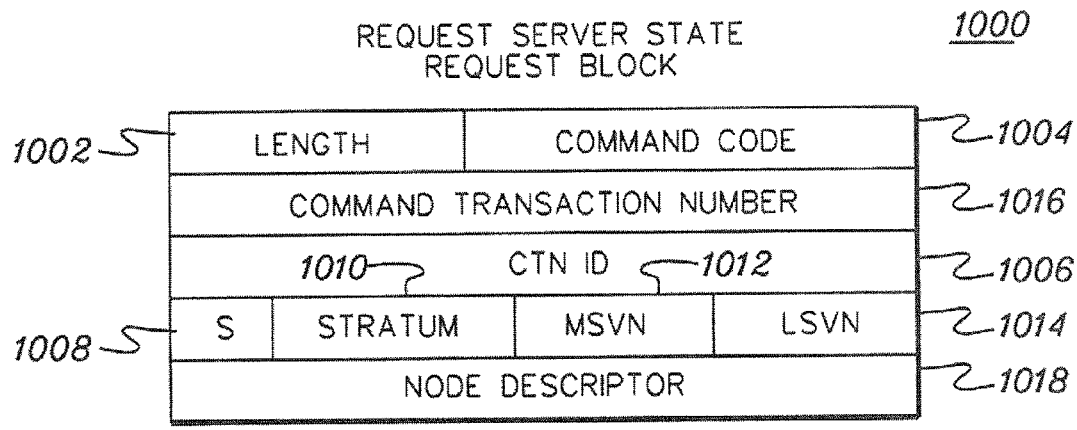
FIG. 10A depicts one embodiment of a request server state request block, in accordance with an aspect of the present invention.

The request server state command is used to request the operational status of the server specified by the node descriptor in the request block. For servers that support a Maximum Supported Version Number (MSVN) greater than one, the command request block includes certain status information of the server issuing the command, including the stratum level and STP version numbers supported. The status of the specified server is provided asynchronously by the console using the write server state command, described below. One embodiment of a command request block for the request server state command is described with reference to FIG. 10A.

A request server state request block 1000 includes, for instance, the following:

a) Length 1002: This field includes a value specifying a command block length.

b) Command Code 1004: This field specifies the request server state command.

c) Command Transaction Number 1005: This field includes a value that is associated with the command being issued. The command transaction number is returned in the response block for the command.

d) CTN ID 1006: For servers with MSVN (described below) greater than 1, this field includes the CTN ID of the server sending the command. Otherwise, this field is reserved and set to zero.

e) Status Valid (S) 1008: This field, when set to one, indicates that the values of the stratum, MSVN, and LSVN fields, described below, are valid.

f) Stratum 1010: When valid, this field includes the stratum level of the server sending the command. When not valid, this field is reserved and set to zero. The field is valid when S is set to one.

g) Maximum Supported Version Number (MSVN) 1012: When valid, this field includes the MSVN of the server sending the command. When not valid, this field is reserved and set to zero. The field is valid when S is set to one.

h) Lowest Supported Version Number (LSVN) 1014: When valid, this field includes the LSVN of the server sending the command. When not valid, this field is reserved and set to zero. The field is valid when bit S is set to one.

i) Node Descriptor 1018: This field includes a node descriptor of the server for which status is being requested.

Figure 10B:
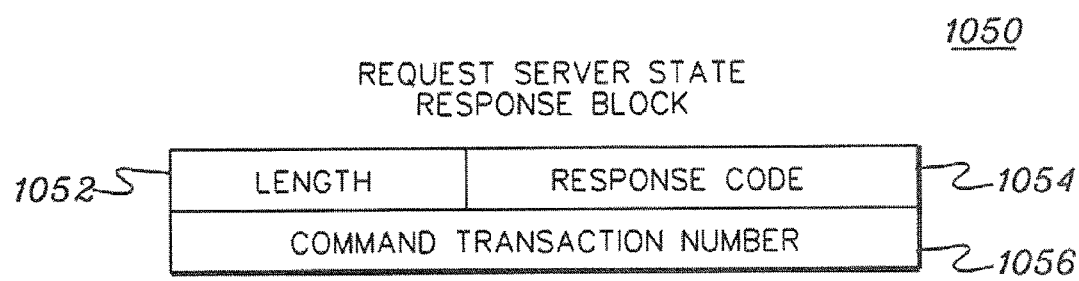
FIG. 10B depicts one embodiment of a request server state response block, in accordance with an aspect of the present invention.

One embodiment of a command response block 1050 for the request server state command is described with reference to FIG. 10B. Response block 1050 includes, for instance:

a) Length 1052: This field includes a value specifying a command block length.

b) Response Code 1054: This field includes the response code for the command.

c) Command Transaction Number 1056: This field includes the value provided in the command transaction number field of the command request block.

The exchange server state command sends server state information in the request block to a server and retrieves server state information from the server in the response block. It can provide the version number of a requesting server and obtain the version number of the responding server in a single operation. A node descriptor in the request block identifies the server for which state information is being provided. The command is issued by the console after accepting a request server state command and is issued to the server specified in the request block of the request server state command. The request server state command provides the server state information and the node descriptor to be provided in the request block of the exchange server state command.

Figure 11A:
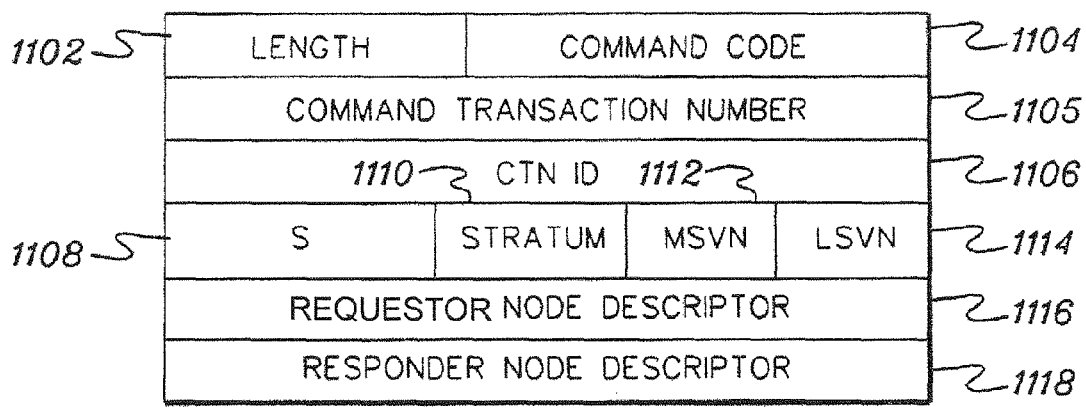
FIG. 11A depicts one embodiment of an exchange server state request block, in accordance with an aspect of the present invention.

One embodiment of a command request block for the exchange server state command is described with reference to FIG. 11A. In one example, an exchange server state request block 1100 includes the following:

a) Length 1102: This field includes a value specifying a command block length.

b) Command Code 1104: This field includes a value specifying the exchange server state command.

c) Command Transaction Number 1105: This field includes a value that is associated with the command being issued. The command transaction number is returned in the response block for the command.

d) CTN ID 1106: This field includes the CTN ID of the server sending the command.

e) Status Valid (S) 1108: This field, when set to one, indicates that the stratum, MSVN and LSVN fields are valid. When this field is zero, the stratum, MSVN and LSVN fields are reserved and set to zero.

f) Stratum 1110: When valid, this field includes the stratum level of the server specified by the requester node descriptor at the request block. When not valid, this field is reserved and set to zero. The field is valid when S is set to one.

g) Maximum Supported Version Number (MSVN) 1112: When valid, this field includes the MSVN of the server specified by the requestor node descriptor of the request block. When not valid, this field is reserved and set to zero. The field is valid when S is set to one.

h) Lowest Supported Version Number (LSVN) 1114: When valid, this field includes the LSVN of the server specified by the requestor node descriptor of the request block. When not valid, this field is reserved and set to zero. The field is valid when S is set to one.

i) Requestor Node descriptor 1116: This field includes the node descriptor of the server that has requested status of another server via a request server state command.

j) Responder Node descriptor 1118: This field includes the node descriptor of the server for which status is being requested.

Figure 11B:
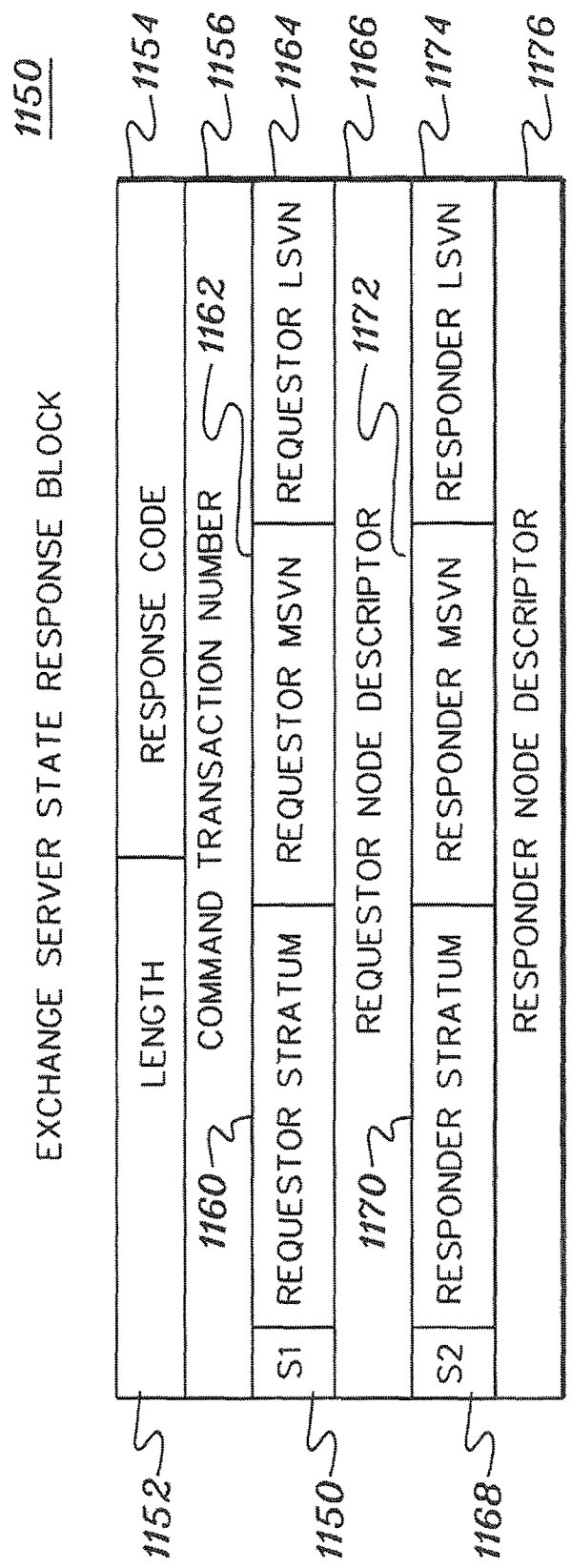
FIG. 11B depicts one embodiment of an exchange server state response block, in accordance with an aspect of the present invention.

One embodiment of a command response block 1150 for the exchange server state command is described with reference to FIG. 11B. Response block 1150 includes, for instance:

a) Length 1152: This field includes a value specifying a command block length.

b) Response Code 1154: This field includes the response code for the command.

c) Command Transaction Number 1156: This field includes the value provided in the command transaction number field of the command request block.

d) Requestor Status Valid (S1) 1158: This field, when set to one, indicates that the requestor stratum, MSVN and LSVN fields are valid. When this field is zero, those fields are reserved and set to zero.

e) Requestor Stratum 1160: When valid, this field includes the stratum level of the server specified by the requester node descriptor of the request block. When not valid, this field is reserved and set to zero. The field is valid when S1 is set to one.

f) Requestor Maximum Supported Version Number 1162: When valid, this field includes the MSVN of the server specified by the requester node descriptor of the request block. When not valid, this field is reserved and set to zero. The field is valid when S1 is set to one.

g) Requestor Lowest Supported Version Number 1164: When valid, this field includes the LSVN of the server specified by the requester node descriptor of the request block. When not valid, this field is reserved and set to zero. The field is valid when S1 is set to one.

h) Requester Node descriptor 1166: This field includes the node descriptor specified in the requestor node descriptor field in the command request block.
i) Responder Status Valid (S2) 1168: This field, when set to one, indicates that the responder stratum, MSVN and LSVN fields are valid. When this field is zero, those fields are reserved and set to zero.
j) Responder Stratum 1170: When valid, this field includes the stratum level of the server specified by the responder node descriptor of the response block. When not valid, this field is reserved and set to zero. The field is valid when S2 is set to one.
k) Responder Maximum Supported Version Number (MSVN) 1172: When valid, this field includes the MSVN of the server specified by the responder node descriptor of the request block. When not valid, this field is reserved and set to zero. The field is valid when S2 is set to one.
l) Responder Lowest Supported Version Number 1174: When valid, this field includes the LSVN of the server specified by the responder node descriptor of the response block. When not valid, this field is reserved and set to zero. The field is valid when S2 is set to one.
m) Responder Node descriptor 1176: This field includes the node descriptor of the server for which status is being provided.

The write server state command is used to provide information regarding the operational state and certain parameters of another server or to instruct the receiving server to enter a new operating state. The state code field indicates whether the state code applies to another server or to the server receiving the command. When the state code applies to another server, the node descriptor field identifies the server to which the state code applies.

Figure 12A:
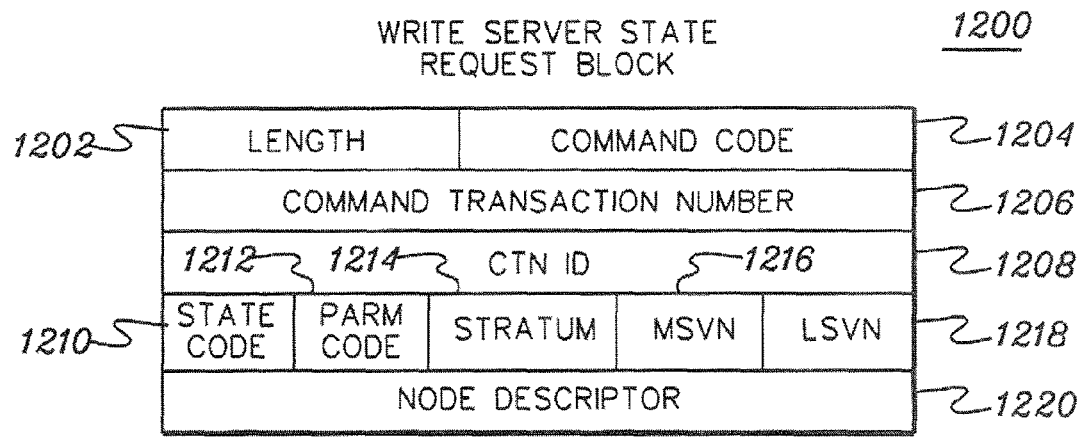
FIG. 12A depicts one embodiment of a write server state request block, in accordance with an aspect of the present invention.

One embodiment of a command request block for the write server state command is described with reference to FIG. 12A. In one example, a write server state request block 1200 includes the following:
a) Length 1202: This field includes a value specifying a command block length.
b) Command Code 1204: This field includes a value specifying the write server state command.
c) Command Transaction Number 1206: This field includes a value that is associated with the command being issued. The command transaction number is returned in the response block for the command.
d) CTN ID 1208: For servers with an MSVN greater than 1, this field includes the CTN ID of the server sending the command. Otherwise, this field is reserved and set to zero.
e) State Code 1210: This field includes a state code (e.g., 4-bits), as defined below.

| Hex Code | |
|---|---|
| 0 | The state of the server specified by the node descriptor field is operational. |
| 1 | The state of the server specified by the node descriptor field is unknown. |
| 2 | The state of the server specified by the node descriptor field is in the checkstopped state. |
| 3 | The state of the server specified by the node descriptor field is powered off. |
| 4 | The server receiving this command is to be put into the lost-clock call-home-disabled state. While in this state, a server does not perform a call home when it detects a lost-clock condition. |
| 5-F | Reserved. | f) Parameter Code (PC) 1212: This field includes a state code (e.g., 2-bits), as defined below.
Code
0 Stratum, MSVN and LSVN fields are reserved and set to zero—the fields are not defined for this STP version level.
1 The parameters in Stratum, MSVN and LSVN include valid information.
2 The parameters in Stratum, MSVN and LSVN do not include valid information—the server specified by the node descriptor indicated with a response code that it does not support the console exchange server state command required to obtain the parameters.
3 The parameters in Stratum, MSVN and LSVN do not include valid information—the console was not able to issue an exchange server state command to the server specified by the node descriptor or did not receive a response to the exchange server state command from the server specified by the node descriptor.
g) Stratum 1214: When valid, this field includes the stratum level of the server specified by the node descriptor of the request block. When not valid, this field is reserved and set to zero. The field is valid when the PC field is set to, for instance, b'01'.
h) Maximum Supported Version Number (MSVN) 1216: When valid, this field includes the MSVN of the server specified by the node descriptor of the request block. When not valid, this field is reserved and set to zero. The field is valid when the PC field is set, for instance, to b'01'.
i) Lowest Supported Version Number (LSVN) 1218: When valid, this field includes the LSVN of the server specified by the node descriptor of the request block. When not valid, this field is reserved and set to zero. The field is valid when the PC field is set to, for instance, b'01'.
j) Node Descriptor 1220: This field includes the node descriptor of the server for which status is being reported.

Figure 12B:
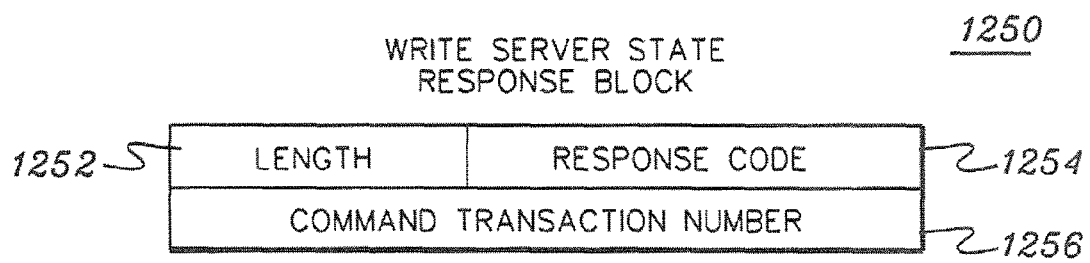
FIG. 12B depicts one embodiment of a write server state response block, in accordance with an aspect of the present invention.

One embodiment of the command response block for the write server state command is described with reference to FIG. 12B. In one example, a write server state response block 1250 includes the following:
a) Length 1252: This field includes the value specifying a command block length.
b) Response Code 1254: This field includes the response code for the command.
c) Command Transaction Number 1256: This field includes the value provided in the command transaction number field of the command request block.

Described in detail above is a capability that enables updates to be made at individual servers of a Coordinated Timing Network and allows the servers of the network to have different capabilities. The individual capabilities of a server are indicated by one or more version numbers, which are known to the other servers of the network. The servers use this information to communicate appropriately with other servers.

In one example, a server can operate at one version number and communicate at another version number with a particular server. For instance, a server may operate at VN=4 but communicate with another server at VN=2. Thus, in this example, the server operates, independent of communication, at VN=4.

The version numbers of a server (e.g., maximum version number and/or minimum version number) can be dynamically updated when the server is updated with new or different capabilities. A version number update procedure is used that enables a version number to be updated coherently and absent disruption of timing synchronization of at least one server of the network.

In one embodiment, one or more aspects of the present invention can be executed in a processing environment that is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-05, April 2007, which is hereby incorporated herein by reference in its entirety. In such an environment, instructions and/or logic, which is specified in the z/Architecture® and designed to execute on a z/Architecture® machine, is emulated to execute on an architecture other than the z/Architecture®. One example of this processing environment is described with reference to FIGS. 13-14.

Figure 13:
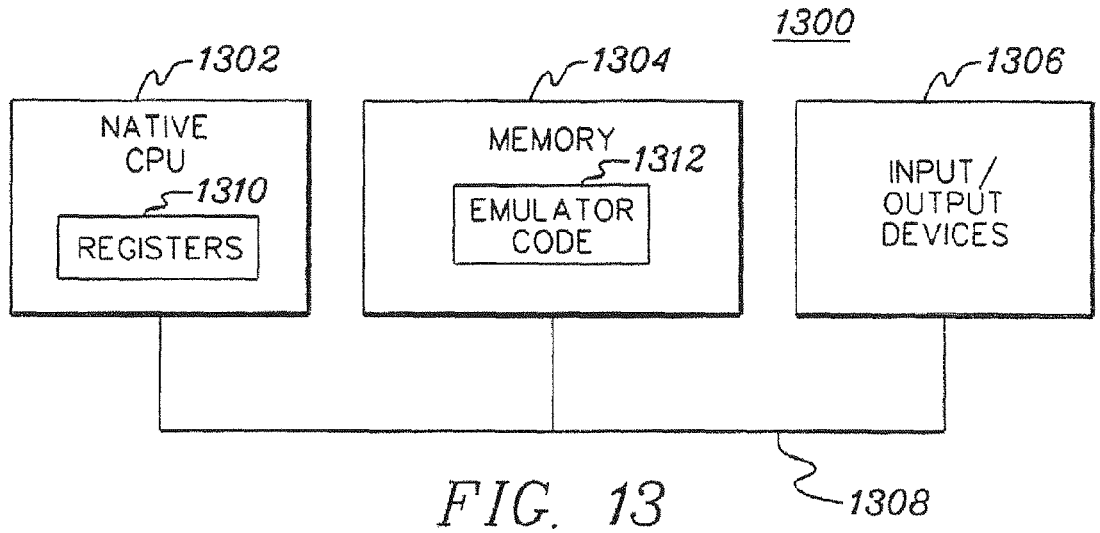
FIG. 13 depicts one embodiment of a processing environment to incorporate and use one or more aspects of the present invention.

Referring to FIG. 13, one embodiment of a processing environment to incorporate and use one or more aspects of the present invention is described. Processing environment 1300 includes, for instance, a native central processing unit 1302, a memory 1304 (e.g., main memory) and one or more input/output (I/O) devices 1306 coupled to one another via, for example, one or more buses 1308 and/or other connections. As examples, processing environment 1300 may include a Power PC® processor, a pSeries® server, or an xSeries® server offered by International Business Machines Corporation, Armonk, N.Y.; an HP Superdome with Intel® Itanium® 2 processors offered by Hewlett-Packard Company, Palo Alto, Calif.; and/or other machines based on architectures offered by IBM®, Hewlett-Packard, Intel®, Sun Microsystems or others. Power PC®, pSeries® and xSeries® are registered trademarks of International Business Machines Corporation, Armonk, N.Y., U.S.A. Intel® and Itanium® 2 are registered trademarks of Intel Corporation, Santa Clara, Calif.

Native central processing unit 1302 includes one or more native registers 1010, such as one or more general purpose registers and/or one or more special purpose registers, used during processing within the environment. These registers include information that represent the state of the environment at any particular point in time.

Moreover, native central processing unit 1302 executes instructions and code that are stored in memory 1304. In one particular example, the central processing unit executes emulator code 1312 stored in memory 1304. This code enables the processing environment configured in one architecture to emulate another architecture. For instance, emulator code 1312 allows machines based on architectures other than the z/Architecture®, such as Power PC® processors, pSeries® servers, xSeries® servers, HP Superdome® servers, or others to emulate the z/Architecture® and to execute software and instructions developed based on the z/Architecture®.

Figure 14:
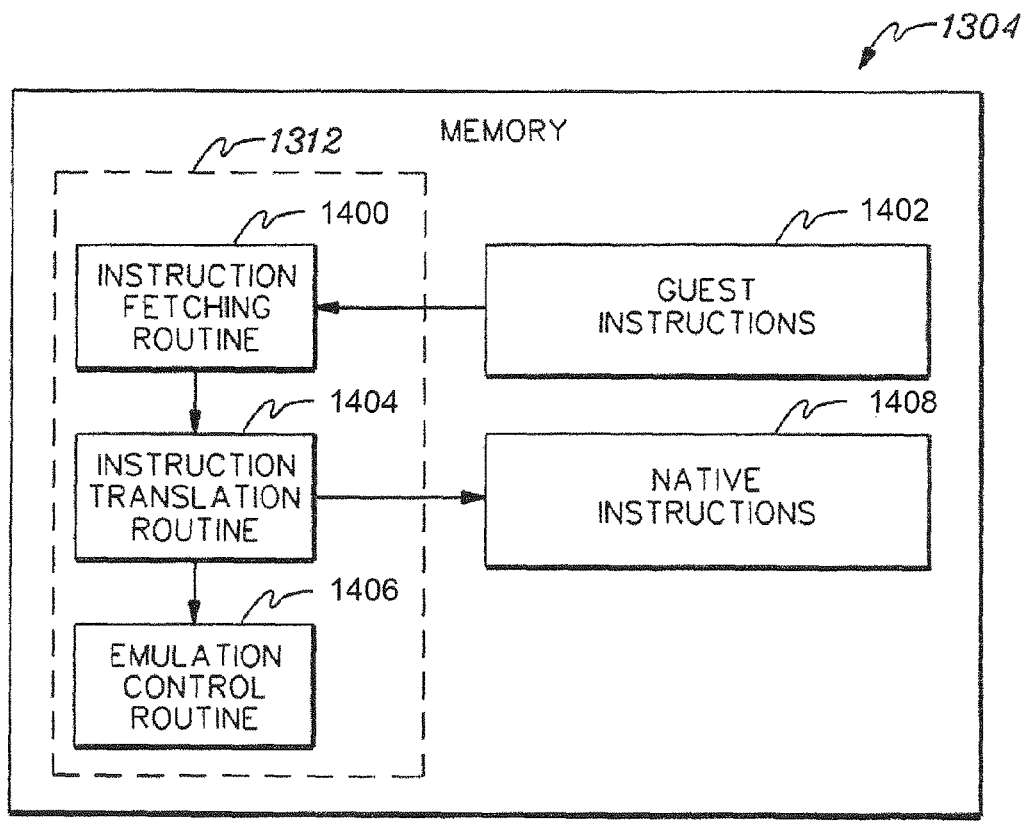
FIG. 14 depicts further details of the memory of FIG. 13, in accordance with an aspect of the present invention.

Further details relating to emulator code 1312 are described with reference to FIG. 14. Guest instructions 1402 comprise software instructions (e.g., machine instructions) that were developed to be executed in an architecture other than that of native CPU. For example, guest instructions 1402 may have been designed to execute on z/Architecture® processor, but are instead being emulated on native CPU 1302 (which may be for example an Intel® Itanium® 2 processor). In one example, emulator code 1312 includes an instruction fetching routine 1400 to obtain one or more guest instructions 1402 from memory 1304, and to optionally provide local buffering for the instruction obtained.

Emulator code 1312 further includes an instruction translation routine 1404 to determine the type of guest instruction that has been obtained and to provide one or more native instructions 1408 that correspond to the guest instruction. In one example, the providing includes creating during, for instance, a translation process, a native stream of instructions for a given guest instruction. This includes identifying the function and creating the equivalent native instructions. In a further example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

Emulator code 1312 further includes an emulation control routine 1406 to cause the native instructions to be executed. Emulation control routine 1406 may cause native CPU 1302 to execute a routine of native instructions that emulate one or more previously obtained guest instructions and, at the conclusion of such execution, to return control to the instruction fetch routine to emulate the obtaining of the next guest instruction or group of guest instructions. Execution of the native instructions 1408 may include loading data into a register from memory 1304; storing data back to memory from a register; or performing some type of arithmetic or logical operation, as determined by the translation routine. Each routine is, for instance, implemented in software, which is stored in memory and executed by the native central processing unit 1302. In other examples, one or more of the routines or operations are implemented in firmware, hardware, software or some combination thereof. The registers of the emulated guest processor may be emulated using the registers 1310 of the native CPU or by using locations in memory 1304. In embodiments, guest instructions 1402, native instructions 1408, and emulation code 1312 may reside in the same memory or may be dispersed among different memory devices.

In yet a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a system (e.g., computer system) or sold separately.

Figure 15:
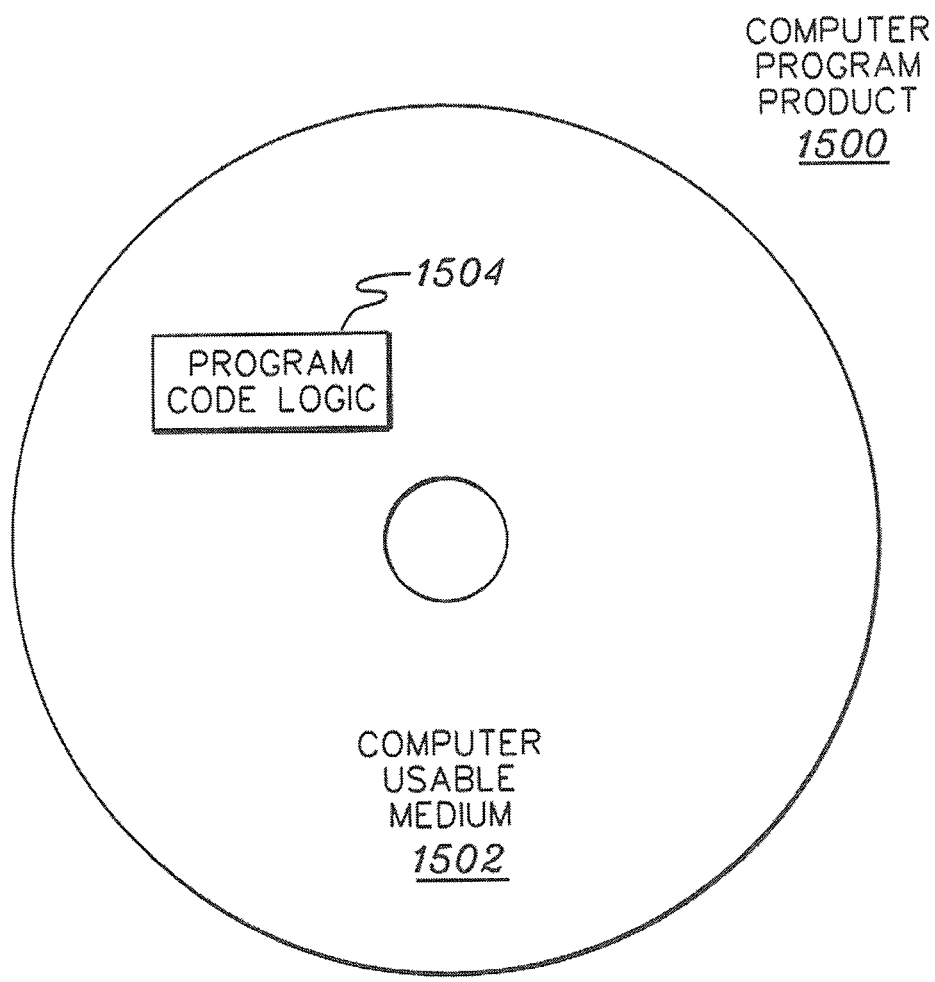
FIG. 15 depicts one example of a computer program product to incorporate one or more aspects of the present invention.

One example of an article of manufacture or a computer program product incorporating one or more aspects of the present invention is described with reference to FIG. 15. A computer program product 1500 includes, for instance, one or more computer usable media 1502 to store computer readable program code means or logic 1504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Described herein are capabilities that facilitate the maintaining of time synchronization by multiple distinct computing systems to form a Coordinated Timing Network. Servers in the timing network make use of the Server Time Protocol to pass timekeeping information over existing high speed data links between systems that provide the capability for the time of day clocks at each system to be synchronized to the accuracy required in today's high end computing systems. The use of STP over high-speed, low latency links provides the capability to synchronize all systems in the CTN to the accuracy of, for instance, a few microseconds when based on a reference time provided by a single server.

STP provides the capability to set and maintain timekeeping information within the CTN, such as time zone, daylight savings time offset, and a leap seconds offset. The information may be updated within the CTN in a scheduled and coherent fashion, such that all changes occur at the same time at all servers in the CTN. This prevents potential system exposures and disruptions that occur when these parameters are updated in a haphazard fashion, creating time setting discrepancies between computers.

CTN parameters may be set and read by an operator via the STP console interface. CTN parameters include server connectivity, local time information, such as time zone and daylight savings time, and the leap seconds required to compute the UTC. The console itself is any element that provides an operator interface to display and set CTN parameters, and that has the capability to communicate with the STP facility.

A single active stratum-1 server is provided as the clock source for the network. The time of day clock at the active stratum-1 server may be set to any time, but generally, is set to an external time reference, such as a dial up to UTC. Other servers are permitted to join the CTN, if they have an undefined stratum-1 configuration, known as a null configuration, or if they have a stratum-1 configuration that matches that of the primary time server. Thus, synchronization accuracy within the CTN is not dependent on the quality of an external time source or even of the existence of an external time source at the stratum-1 server. This ensures that servers in the CTN are synchronizing to the same root primary reference time.

An alternate server is defined such that it is capable of taking over as the active stratum server in the event of a failure at the active stratum-1 server. This prevents a single point of failure for the CTN, such that servers in the CTN can maintain or regain synchronization within the timing network despite a failure at the active stratum-1 server.

Further, in accordance with an aspect of the present invention, servers within the CTN can operate with different capabilities, and one server communicates to another server based on the capabilities of the another server. A server may be updated independently of other systems without affecting the network.

Additional information regarding timing networks is provided in the following patent applications, each of which is hereby incorporated herein by reference in its entirety: U.S. Provisional Ser. No. 60/887,584 entitled "Facilitating Synchronization Of Servers In A Coordinated Timing Network," filed Jan. 31, 2007; U.S. Ser. No. 11/876,152 entitled "Facilitating Synchronization Of Servers In a Coordinated Timing Network," filed Oct. 22, 2007; U.S. Ser. No. 11/876,199 entitled "Definition Of A Primary Active Server In A Coordinated Timing Network," filed Oct. 22, 2007; U.S. Provisional Ser. No. 60/887,562 entitled "Defining A Stratum-1 Configuration In A Coordinated Timing Network", filed Jan. 31, 2007; U.S. Ser. No. 11/876,240 entitled "Employing Configuration Information To Determine The Role Of A Server In A Coordinated Timing Network", filed Oct. 22, 2007; U.S. Provisional Ser. No. 60/887,576 entitled "Method And System For Establishing A Logical Path Between Servers In A Coordinated Timing Network", filed Jan. 31, 2007; U.S. Ser. No. 11/876,272 entitled "Establishing A Logical Path Between Servers In A Coordinated Timing Network," filed Oct. 22, 2007; U.S. Provisional Ser. No. 60/887,586 entitled "Facilitating Recovery In A Coordinated Timing Network," filed Jan. 31, 2007; U.S. Ser. No. 11/876,323 entitled "Facilitating Recovery In A Coordinated Timing Network," filed Oct. 22, 2007; U.S. Provisional Ser. No. 60/887,544 entitled "Channel Subsystem Server Time Protocol Commands," filed Jan. 31, 2007; U.S. Ser. No. 11/876,796 entitled "Channel Subsystem Server Time Protocol Commands And System Therefor," filed Oct. 23, 2007; U.S. Provisional Ser. No. 60/887,512 entitled "Server Time Protocol Messages And Methods," filed Jan. 31, 2007; U.S. Ser. No. 11/940,518 entitled "Server Time Protocol Messages And Methods," filed Nov. 15, 2007; U.S. Ser. No. 11/468,352, entitled "Coordinated Timing Network Configuration Parameter Update Procedure," filed Aug. 30, 2006; U.S. Ser. No. 11/460,025, entitled "Directly Obtaining By Application Programs Information Usable In Determining Clock Accuracy," filed Jul. 26, 2006; U.S. Ser. No. 11/223,886, entitled "System And Method For TOD-Clock Steering," filed Sep. 9, 2005; U.S. Ser. No. 11/532,168, entitled "Synchronization Signal For TOD-Clock Steering Adjustment," filed Sep. 15, 2006; U.S. Ser. No. 11/468,501, entitled "Managing Data Access Via A Loop Only If Changed Locking Facility," filed Aug. 30, 2006; U.S. Ser. No. 11/223,878, entitled Clock Filter Dispersion," filed Sep. 9, 2005; U.S. Ser. No. 11/223,876, entitled "Method And System For Clock Skew And Offset Estimation," filed Sep. 9, 2005; U.S. Ser. No. 11/223,577, entitled "Use Of T4 Timestamps To Calculate Clock Offset And Skew," filed Sep. 9, 2005; and U.S. Ser. No. 11/223,642 entitled "System And Method For Calibrating A TOD Clock," filed Sep. 9, 2005.

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

Moreover, although various control blocks have been described, each of these control blocks can include additional, less and/or different information. The location within the control block and the size of each field within the control block can vary for different embodiments.

As used herein, the term "obtaining" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention, and these are, therefore, considered to be within the scope of the invention as defined in the claims.

What is claimed is:

1. A computer program product for facilitating communication within a timing network of servers, the computer program product comprising:
    a non-transitory storage medium readable by a processor and storing instructions for execution by the processor for performing a method, the method comprising:
        operating by one server at one level of timing capability indicated by a version number, the version number indicating one or more supported timing features of the one server;
        obtaining by the one server at least one version number supported by another server, the at least one version number supported by the another server indicating one or more versions of timing capability supported by the another server;
        determining by the one server, using the obtained at least one version number supported by the another server, a negotiated version number for use in communicating with the another server, the negotiated version number indicating a compatible level of timing capability common to the one server and the another server but different from the one level of timing capability; and
        communicating by the one server with the another server at the compatible level of timing capability common to the one server and the another server but different from the one level of timing capability, wherein the one server operates at the one level of timing capability indicated by the version number and communicates with the another server at the compatible level of timing capability indicated by the negotiated version number.

2. The computer program product of claim 1, wherein the timing network comprises an additional server, said additional server operating, independent of communication, at an additional level of timing capability, said additional level of timing capability being different from said one level of timing capability and said compatible level of timing capability, and wherein the one server communicates to the another server at the compatible level of timing capability indicated by the negotiated version number, and the one server communicates with the additional server at a level of timing capability supported by both the one server and the additional server.

3. The computer program product of claim 1, wherein the method further comprises updating a version number of a server of the timing network, wherein the updating is independent of an updating of a version number of one or more other servers of the timing network.

4. The computer program product of claim 3, wherein the updating of the version number is absent disruption of timing synchronization of the timing network.

5. The computer program product of claim 1, wherein a server of the timing network has one or more version numbers associated therewith including a minimum supported version number and a maximum supported version number.

6. The computer program product of claim 5, wherein the minimum supported version number is different from the maximum supported version number, and the one or more version numbers includes at least one version number between the minimum supported version number and the maximum supported version number.

7. The computer program product of claim 5, wherein the minimum supported version number is the same as the maximum supported version number.

8. The computer program product of claim 1, wherein the method further comprises updating a selected version number of a selected server of the timing network, said updating comprising:
    notifying, by the selected server, one or more other servers of the timing network that the selected version number is being updated;
    determining that the update has taken effect; and
    updating at the selected server the selected version number.

9. The computer program product of claim 8, wherein the updating further comprises:
    storing, by the one or more other servers, the updated version number for use by the one or more other servers;
    modifying, by the selected server and the one or more other servers, an active version number for the selected server and the one or more other servers, respectively;
    determining, in response to the modifying for each pair of servers comprising the selected server and one other server of the one or more other servers, whether there is a common version number supported by the selected server and the one other server; and
    removing communication paths between the selected server and the one other server, in response to the determining indicating there is no common version number.

10. The computer program product of claim 1, wherein the determining is performed at initialization of a communication path between the one server and the another server.

11. The computer program product of claim 1, wherein the method further comprises performing a version number compatibility check to determine the negotiated version number, which is common to the one server and the another server.

12. The computer program product of claim 1, wherein the one level of timing capability includes aspects related to Server Time Protocol timing, including at least one of recovery, configuration, timing management, formatting of time synchronization messages and time of day clock synchronization.

13. The computer program product of claim 1, wherein the version number comprises a Server Time Protocol version number.

14. A computer-implemented method of facilitating communication within a timing network of servers, said method comprising:

operating by one server at one level of timing capability indicated by a version number, the version number indicating one or more supported timing features of the one server;

obtaining by the one server at least one version number supported by another server, the at least one version number supported by the another server indicating one or more versions of timing capability supported by the another server;

determining by the one server, using the obtained at least one version number supported by the another server, a negotiated version number for use in communicating with the another server, the negotiated version number indicating a compatible level of timing capability common to the one server and the another server but different from the one level of timing capability; and communicating by the one server with the another server at the compatible level of timing capability common to the one server and the another server but different from the one level of timing capability, wherein the one server operates at the one level of timing capability indicated by the version number and communicates with the another server at the compatible level of timing capability indicated by the compatible version number.

15. The computer-implemented method of claim 14, wherein the timing network comprises an additional server, said additional server operating, independent of communication, at an additional level of timing capability, said additional level of timing capability being different from said one level of timing capability and said compatible level of timing capability, and wherein the one server communicates to the another server at the compatible level of timing capability indicated by the negotiated version number, and the one server communicates with the additional server at a level of timing capability supported by both the one server and the additional server.

16. The computer-implemented method of claim 14, further comprising updating a selected version number of a selected server of the timing network, said updating comprising:

notifying, by the selected server, one or more other servers of the timing network that the selected version number is being updated;

determining that the update has taken effect; and updating at the selected server the selected version number.

17. The computer-implemented method of claim 16, wherein the updating further comprises:

storing, by the one or more other servers, the updated version number for use by the one or more other servers;

modifying, by the selected server and the one or more other servers, an active version number for the selected server and the one or more other servers, respectively;

determining, in response to the modifying for each pair of servers comprising the selected server and one other server of the one or more other servers, whether there is a common version number supported by the selected server and the one other server; and removing communication paths between the selected server and the one other server, in response to the determining indicating there is no common version number.

18. A computer system for facilitating communication within a timing network of servers, said computer system comprising:

a memory; and a processor in communications with the memory, wherein the computer system is configured to perform a method, the method comprising:

operating by one server at one level of timing capability indicated by a version number, the version number indicating one or more supported timing features of the one server;

obtaining by the one server at least one version number supported by another server, the at least one version number supported by the another server indicating one or more versions of timing capability supported by the another server;

determining by the one server, using the obtained at least one version number supported by the another server, a negotiated version number for use in communicating with the another server, the negotiated version number indicating a compatible level of timing capability common to the one server and the another server but different from the one level of timing capability; and communicating by the one server with the another server at the compatible level of timing capability common to the one server and the another server but different from the one level of timing capability, wherein the one server operates at the one level of timing capability indicated by the version number and communicates with the another server at the compatible level of timing capability indicated by the negotiated version number.

19. The computer system of claim 18, wherein the timing network comprises an additional server, said additional server operating, independent of communication, at an additional level of timing capability, said additional level of timing capability being different from said one level of timing capability and said compatible level of timing capability, and wherein the one server communicates to the another server at the compatible level of timing capability indicated by the negotiated version number, and the one server communicates to the additional server at a level of timing capability supported by both the one server and the additional server.

* * * * *